US010746862B2

(12) United States Patent
Dammert et al.

(10) Patent No.: US 10,746,862 B2
(45) Date of Patent: Aug. 18, 2020

(54) SHORT RANGE RADAR COHABITATION

(71) Applicant: SAAB AB, Linkoeping (SE)

(72) Inventors: Patrik Dammert, Goeteborg (SE); Hans Hellsten, Linkoeping (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/483,069

(22) PCT Filed: Feb. 5, 2018

(86) PCT No.: PCT/SE2018/050096
§ 371 (c)(1),
(2) Date: Aug. 2, 2019

(87) PCT Pub. No.: WO2018/147786
PCT Pub. Date: Aug. 16, 2018

(65) Prior Publication Data
US 2019/0391246 A1    Dec. 26, 2019

(30) Foreign Application Priority Data

Feb. 7, 2017  (SE) ........................................ 1750107
Mar. 7, 2017  (SE) ........................................ 1750258

(51) Int. Cl.
*G01S 13/32* (2006.01)
*G01S 7/02* (2006.01)
*G01S 13/931* (2020.01)
*G01S 7/35* (2006.01)

(52) U.S. Cl.
CPC .............. *G01S 13/32* (2013.01); *G01S 7/023* (2013.01); *G01S 13/931* (2013.01); *G01S 2007/356* (2013.01)

(58) Field of Classification Search
CPC ........ G01S 13/32; G01S 7/023; G01S 13/931; G01S 2007/356
USPC ........................................................ 342/196
See application file for complete search history.

(56) References Cited

U.S. PATENT DOCUMENTS 8,344,933 B1 *  1/2013  Kronfeld ................. G01S 7/006
                                                    342/25 R

FOREIGN PATENT DOCUMENTS

EP           2251705 A1    11/2010
WO     WO-2011/102762 A1    8/2011

OTHER PUBLICATIONS

International Searching Authority, International Search Report and Written Opinion for International Application No. PCT/SE2018/050096, May 31, 2019, (19pages) Stockholm, Sweden.

(Continued)

*Primary Examiner* — Timothy A Brainard
(74) *Attorney, Agent, or Firm* — Alston & Bird LLP

(57) ABSTRACT

The present invention relates to a method for a continuous arbitrary waveform radar configured for transmitting and receiving signals over a selected communication band. The method comprises: generating the radar transmit signal with a waveform having a non-monotonic frequency change, modifying the waveform to obtain at least one spectral notch and isolating reception and transmission by cancellation. Each spectral notch at a selectable frequency with a selectable bandwidth, and the waveform is modified to maintain the spectral density of the transmit radar signal.

28 Claims, 13 Drawing Sheets

(56) References Cited

OTHER PUBLICATIONS

Brooker, Graham M. *Mutual Interference of Millimeter-Wave Radar Systems*, IEEE Transactions On Electromagnetic Compatibility, vol. 49, No. 1, Feb. 2007, pp. 170-181.

Schipper, Tom et al. *Simulative Prediction of the Interference Potential Between Radars in Common Road Scenarios*, IEEE Transactions On Electromagnetic Compatibility, vol. 57, No. 3, Jun. 2015, pp. 322-328.

Goppelt, M. et al. *Analytical Investigation of Mutual Interference Between Automotive FMCW Radar Sensors*, In Proceedings of the 6th German Microwave Conference, Mar. 14-16, 2011, (4 Pages), Darmstadt, Germany.

\* cited by examiner

SHORT RANGE RADAR COHABITATION

CROSS REFERENCE TO RELATED APPLICATIONS

This application is a National Stage Application, filed under 35 U.S.C. § 371, of International Application No. PCT/SE2018/050096, filed Feb. 5, 2018, which claims priority to Swedish Application No. 1750107-3, filed Feb. 7, 2017, and Swedish Application No. 1750258-4, filed Mar. 7, 2017; the contents of which are hereby incorporated by reference in their entirety.

BACKGROUND

Related Field

The present invention relates to a method for a continuous arbitrary waveform radar configured for transmitting and receiving signals over a selected communication band. The invention also relates to a CAW radar, a vehicle, a communication unit, and a radar system.

Description of Related Art

Historically radar was a piece of equipment capable of transmitting a short electromagnetic pulse, and thereafter switching to a reception mode in which the echo of the pulse from distant objects was received. The pulse did not have any inner modulation—the word impulse will be used here for this type of transmit signal. The time between transmission of the impulse and echo reception was determined whereupon the range to the objects followed. The impulse shape for the transmitted signal was chosen for the two reasons of 1) it enabled precise time measurements and 2) concentrating the transmitted power to an impulse created leeway of no interfering transmissions, in which the radar receiver was very sensitive to incoming weak signals.

In the subsequent radar development radar performance has been improved by substituting the impulse transmit signal for a prolonged signal, thereby increasing its electromagnetic energy. Using the inner modulation of the signal, precise timing of the echoes is still possible by the technique of matched filters. The factor limiting range resolution becomes the bandwidth and not the actual duration of the transmit signal. Most of today's radars operate on this principle, with intermittent transmissions intervened with intervals of reception, and thus still comply with condition 2 above. This condition may be expressed as a requirement on orthogonality between transmit and receive signals, enabling the receiver to filter out the signal received from the transmit signal leakage.

Another well-known way of obtaining this orthogonality is the so called FMCW technique (frequency modulated continuous waveform), commonly practiced for small and short range radar units, and automotive radar in particular. The FMCW technique uses a continuous frequency sweep as transmit waveform. The sweep rate is made so fast that the transmit frequency has shifted before the return of echoes. Hence the transmit signal is orthogonal to the echoes, and these can be separated out by a correlation mixer. FMCW radar is simpler in design but transmit/receive isolation will be less efficient than for pulsed radar. High power long range radar is therefore always based on intermittent transmissions. The FMCW technique is commonly adopted for small and short range radar units, e.g. in automotive applications such as collisions warning radars.

As will be discussed, shaping signals from the requirement of transmit/receive orthogonality, radar signals from two radar units operating in the same frequency band will not be orthogonal and will interfere with each other. This is a considerable weakness of both pulsed and FMCW radars, since good radar performance require large bandwidth, and will prevent any large number of radar units in vicinity of each other. This limitation becomes particularly acute in commercial applications such as automotive radar, where a potential mass market of radars has to cohabitate within some assigned frequency band, as discussed in the article "Analytical investigation of mutual interference between automotive FMCW radar sensors", by M. Goppelt, H.-L. Blocher, W. Menzel, published in Proceedings of the 6th German Microwave Conference, 14-16 Mar. 2011, Darmstadt, Germany.

Other articles related to the same issues are "Mutual Interference of Millimeter-Wave Radar Systems", by Graham M. Brooker, published in IEEE Transactions on Electromagnetic Compatibility", 49, no. 1, February 2007, and "Simulative Prediction of the Interference Potential Between Radars in Common Road Scenarios", by Tom Schipper, Silvia Prophet, Marlene Harter, Lukasz Zwirello, Thomas Zwick, published in IEEE Transactions on Electromagnetic Compatibility", 57, no. 3, June 2015

Investigating the issue of radar cohabitation it is important to understand that it is the principles of pulsed and FMCW radar operation, which set the requirement of bandwidth frequency separation in order to avoid mutual interference between radar units. In theory a much denser packing of non-interfering radar channels is conceivable. The idea is the same as for digital television, or mobile phone networks. In analog television (e.g. PAL) several megahertz of bandwidth was required for each television channel. Digital television (e.g. DVB-T) code a large number of essentially orthogonal channels into a similar bandwidth (actually 8 MHz for DVB-T). This possibility of compression rests largely in the concept here termed instantaneous bandwidth. The instantaneous bandwidth for a human receiving audio or image messages is just a small fraction of the nominal bandwidth set by these signal types. For instance an image considered as high resolution by a human viewer contains millions of pixels, whilst watching a movie the images need to be redrawn at a rate of around 25 Hz in order not to be perceived as flickering. In PAL systems the image were completely redrawn at this rate, though at moderate resolution. However the human mind is nowhere near being able to assimilate image information at this information rate, i.e. bandwidth. Actually, going from one image frame to another at 25 Hz rate, only very small differences between images are acceptable for the image sequence to be intelligible. This inertia in image content change is exploited by the image compression of the digital television standards. Audio is much the same—the sound pattern remains stationary for some fraction of a second, sufficient for the human to perceive the pattern, which is utilized in the coding of e.g. speech channels in phone networks and digital audio broadcast.

BRIEF SUMMARY

One object with the present invention is to provide an improved method for transmitting radar signals without interfering with other signals transmitted within the same frequency band compared to prior art.

The object may be achieved with a method for a continuous arbitrary waveform radar configured for transmitting and receiving signals over a selected communication band, the signals comprising at least one communication channel. The method comprises: generating a radar transmit signal with a waveform having a non-monotonic frequency change; modifying the waveform to obtain at least one spectral notch, each spectral notch at a selectable frequency with a selectable bandwidth, the waveform is modified to maintain the spectral density of the transmit radar signal, and isolating reception and transmission by cancellation.

An advantage with the present invention is that a large number of radar systems may operate in the immediate vicinity of each other, within the same frequency band, without mutual interference.

Further objects and advantages will be apparent for a skilled person from the detailed description and the drawings.

DETAILED DESCRIPTION OF VARIOUS EMBODIMENTS

Figure 1A:
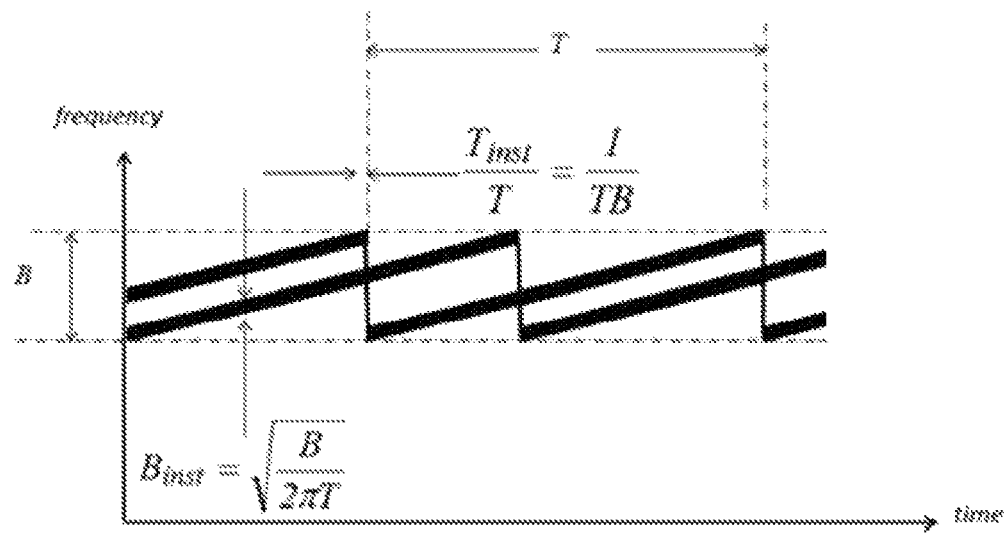
FIG. 1a shows Quasi-orthogonal LFM waveforms with small cross correlation.

The present disclosure is directed to a radar design principle suitable for relatively short range radar applications, where the radar comprises at least one communication channel.

The radar principle allows a large number of radar system to operate in the immediate vicinity of each other, within the same frequency band, and actually adopting the same transmit waveform. Even so, operation will occur without mutual interference. Applications can for instance be automotive, since in this case very many radar units have to co-function in the immediate vicinity of each other and with operation assigned to frequency bands not much wider than the required radar bandwidth.

It is believed that the design principles, which achieve these functions are new and original in at least two ways. For one they provide a method to obtain a combined range and velocity response out of single prolonged signal, which however is non-periodic with an ever ongoing change of content and/or frequency throughout its duration. Secondly the design realizes a method to isolate reception and transmission by cancellation, which is a requirement for the type of arbitrary transmit waveforms exploited. The cancellation method has been previously exploited for low frequency applications (<1 GHz), see WO 2011/102762 A1. In the present setting of microwaves and even millimeter waves, it is however differently turned out, and (in contrast to the previous method) achieves cancellation for an instantaneous narrow band signal, which is a requirement for the principle to be realizable at these high frequencies.

Radar Signal Orthogonality and Instantaneous Bandwidth

The possible instantaneous bandwidth of radar will now be analyzed. In this discussion, the use of linear frequency modulation (LFM) transmit signals will be considered in particular. Such a signal may be represented:

$$S(t) = e^{-i\Phi(t)}; \Phi(t) = \frac{\pi B}{T}(t-\tau)^2 + 2\pi f_c(t-\tau) \quad (3.1)$$

when restricted over a time interval $\tau - T/2 \le t \le \tau + T/2$ (here T is to be termed recurrence time since it spans the entire radar band). The signal may be extended to arbitrary times by periodicity, though this possibility is of no relevance to the present disclosure. The instantaneous frequency is:

$$f_i = \frac{1}{2\pi}\frac{d\Phi}{dt} = \frac{B}{T}(t-\tau) + f_c \quad (3.2)$$

It follows that $f_c = (f_{max} + f_{min})/2$ is center frequency, and $B = f_{max} - f_{min}$ is bandwidth. Moreover center frequency is reached at time $t = \tau$.

As is well-known, for the radar to uniquely track moving objects, attention must be paid to waveform ambiguities. These are generally split into two categories. One form of ambiguity concerns Doppler bandwidth. It demands that the radar signal must be revisit any instantaneous frequency within the radar band at a sufficiently high rate in order that object movements will be sampled at a denser rate than the Doppler bandwidth they create. The other ambiguity class concerns range folding and demands that frequency revisits must occur at a sufficiently low rate in order that the intended range interval will be unambiguously represented by the range response. The Doppler bandwidth criterion can be reformulated into the condition that radar waveforms must be selected from an a priori assumption on the possible dynamic behavior of moving objects. It must be required that motion uncertainties stay within some fraction of the radar wavelength $\lambda$—here $\lambda/4$ will be assumed—over frequency revisit intervals. Hence object dynamics will determine the frequency revisit time which therefore will be denoted $T_{dyn}$. Denoting by $a_{max}$ the maximum possible object acceleration, it follows $$\frac{1}{2}a_{max}T_{dyn}^2 \approx \frac{\lambda}{4} \Leftrightarrow T_{dyn} \approx \sqrt{\frac{\lambda}{2a_{max}}} \quad (3.3)$$

As seen, for a wavelength λ=0.01 m (frequencies around 30 GHz) a maximum acceleration of $a_{max}$=100 m/s² would allow $T_{dyn}$≈0.007 s, i.e. signal recurrence rates of 140 Hz. This low rate provides significant freedom in selecting radar waveforms.

Given that a recurrence time has been agreed on, the radar instantaneous bandwidth follows. Due to the constantly changing instantaneous frequency in (3.1) the sweep is never precisely defined. Indeed for a signal to have its instantaneous bandwidth confined to an interval $\Delta f_i$, the instantaneous frequency must remain in this interval for a time $\Delta t$, with $\Delta t$ subjected to the condition $\Delta f_i \Delta t \approx 1/4\pi$. For the LFM waveform in particular the instantaneous frequency shifts according to the rule $df_i/dt$=B/T. It follows for the instantaneous bandwidth $$\Delta f_{dyn} \approx \sqrt{\frac{B}{4\pi T_{dyn}}} \approx \left(\frac{B^2 a_{max}}{8\pi^2 \lambda}\right)^{1/4} \quad (3.4)$$

Assume an application of automotive road surveillance with parameters as per the example above and radar bandwidth B=1 GHz, i.e. range resolution $\Delta r$=c/2B=0.15 m. In this case $\Delta f_{dyn}$≥106 kHz. This opens for b/$\Delta f_{dyn}$≤9 400 "essentially" orthogonal waveforms (the term quasi-orthogonal radar waveforms—QOW—will be used). Such a QOW set can be obtained from independent time discrete random sequences. Denote the time continuous representation of such a sequence by $N_m$(t); m=1, 2, ..., Since $N_m$(t) mutually decorrelate over times 1/B, there are TB=7×10⁶ possible choices for $N_m$(t), even when based on binary sequences. Therefore, creating 9400 sequences, they will almost certainly all be independent. Then $$CC_{nm} = \frac{\left|\int_{-T/2}^{-T/2} N_n(t) N_m(t) dt\right|^2}{\int_{-T/2}^{-T/2} |N_n(t)|^2 dt \int_{-T/2}^{-T/2} |N_m(t)|^2 dt} = \frac{1}{TB} = -69 \text{ dB} \quad (3.5)$$

A very difficult case would be that the radar band is fully occupied, say that there are 9400 equally strong signals. The inference impact will then increase by 26 000=40 dB but remains tolerably small.

Though these results appears promising for the possibilities of densely packing radar signals, they are difficult to translate into practical radar systems at today's level of technical development. To start with, a practical method of transmitting prolonged arbitrary radar waveforms, without the requirement of received and transmitted signals to be orthogonal (as is the case for pulsed and FMCW systems) has not yet been addressed. Later in the disclosure methods for parallel transmission and reception will be suggested. These methods will however not allow arbitrary waveforms. Another challenge is the significant amount of digital processing required when adopting these prolonged waveforms. Also these processing aspects will be addressed.

Comparing with the literature, the common term waveform diversity has been established for any method of enhancing radar performance by an intelligent shaping of transmit waveforms. One reason for waveform diversity is the suppression of mutual interference, i.e. in the terminology of the present disclosure, the possibility of Quasi-Orthogonal Waveforms. However, according to the analysis above, very far reaching improvements for reducing interference are not possible unless the requirement for orthogonality between transmit and receive signals can be relaxed, enabling a significant increase of recurrence time T and consequential increase in the TB product. From the literature it is also clear that whilst random signals are possible candidates to form the QOW set, they are not optimal for this purpose. There are in fact a large number of investigations (including the so-called Gold codes, used for GPS signals but also with applications to pulsed and FMCW radars) on QOW optimization.

Figure 1B:
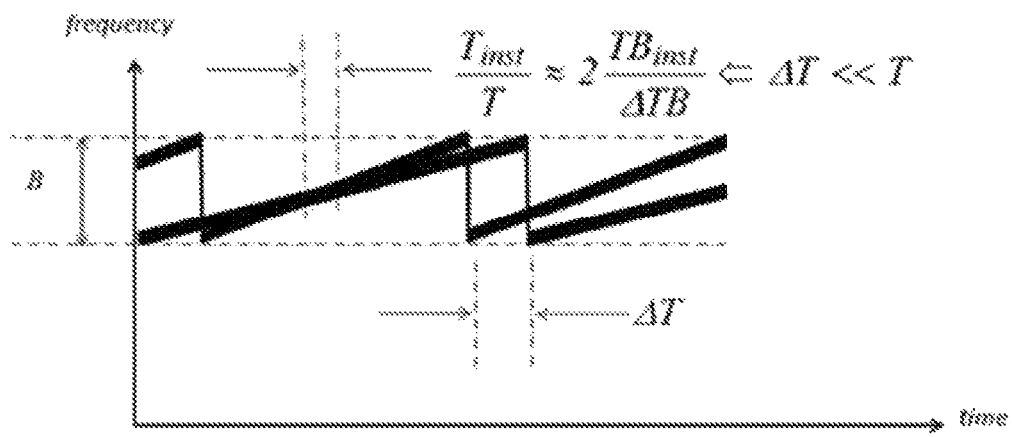
FIG. 1b shows Quasi-orthogonal LFM waveforms with poor orthogonality between LFM waveforms with different sweep rate.

Return now to the LFM signals, which pose a simple way to realize a QOW set. For a fixed radar band, i.e. a fixed B and $f_c$ in (3.1), LFM waveforms can be altered by varying T or τ. Actually, the set of quasi-orthogonal waveforms obtained by just adjusting τ only share frequency at a time interval of the order 1/B when the frequency ramp restarts, as shown in the diagram in FIG. 1a. They thus have very small cross correlation. Signals with different T generally share instantaneous frequency for longer intervals, as shown in the diagram in FIG. 1b. The cross correlation becomes particularly large when frequency ramps at similar (but not equal) rate, i.e. when the difference in T between signals is small. Replacing the random signals with LFM signals in (3.5) these LFM properties will be confirmed. A number of factors—now to be considered—will go into the selecting the LFM waveform parameters. The actual quantitative assessment of the correlation for the appropriate waveforms is found at the end of the next section. A list of main performance figures for the LFM type of QOW signals in a car radar application is found in Table 1.

Figure 2:
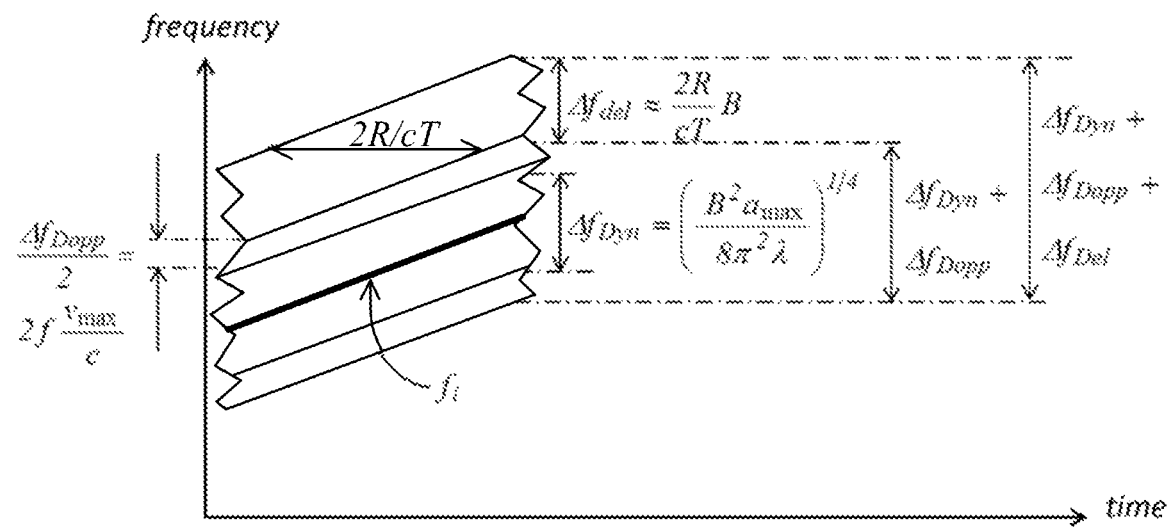
FIG. 2 shows the three mechanisms of spreading instantaneous frequency and causing the instantaneous bandwidth.

A channel correlation smaller than −80 dB is noted.
frequency [GHz]=30
bandwidth [GHz]=1
orthog channels=2331
channel correlation [dB]<−80
acceleration [m/s2]<100
recurrence rate [Hz]=141
non-ambiguous range [m]<300
non-ambiguous speed [m/s]<100
speed accuracy max [m/s]=3
speed accuracy noise [m/s]=21
position accuracy max [m]=0.9
position accuracy noise [m]=4.5
Table 1. Main Parameters in Automotive Example There are in all three fundamental mechanisms, which all broadens instantaneous radar bandwidth and determines how the LFM QOW set should be selected, see FIG. 2. The instantaneous bandwidth $\Delta f_{dyn}$ arising due to object dynamics, has already been analyzed. Moreover objects moving also cause Doppler shifts of the frequencies in the impacting radar band. An assumption on the maximum target speed will correspond to a well-defined upper bound of the instantaneous Doppler bandwidth $\Delta f_{Dopp}$ possible due to Doppler shifts. Thirdly the backscattered signal is not only Doppler shifted but also delayed. This delay off shifts the received instantaneous frequency from the frequency currently transmitted, which is what creates transmit/receive signal orthogonality in the FMCW case. Presently due to the slow sweep rate and for reasonably short ranges, the frequency spreading $\Delta f_{del}$ caused by signal delays is reasonably small so a large number of quasi orthogonal radar channels is still possible.

The overall instantaneous bandwidth may consequently be defined $$B_i = \Delta f_{dyn} + \Delta f_{dopp} + \Delta f_{del} \quad (3.6)$$

As regards Doppler bandwidth, when obeying (3.3), object motion within the recurrence time can be assumed occurring with constant range speed v.

Figure 3:
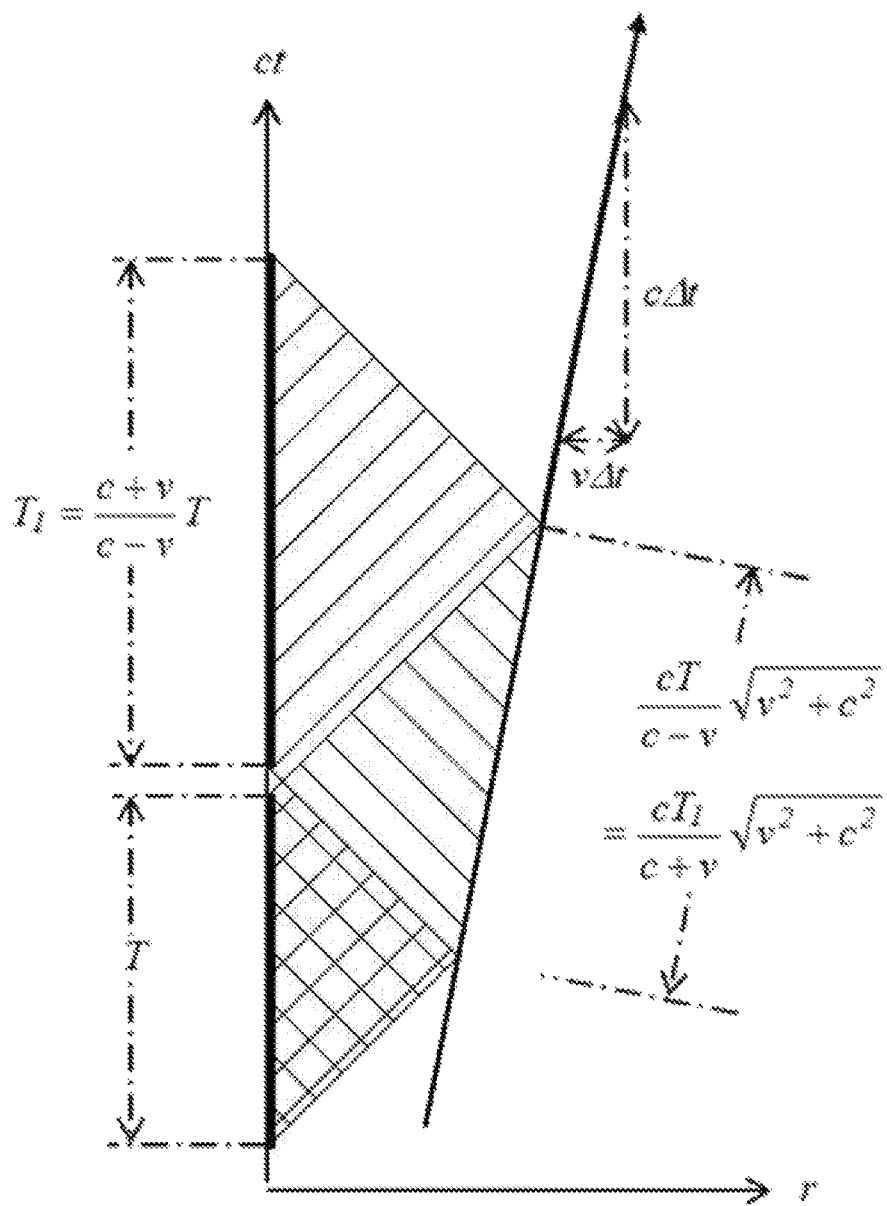
FIG. 3 shows a geometry explaining recurrence time frequency shifts cause by an object linear motion

FIG. 3 considers such a case of an object moving at constant speed and being hit by a signal transmitted during the time span T. As shown in the figure, for the signal backscattered to the radar the signal segment duration) has shifted according to T→T(c+v)/(c−v). This rule applies to the recurrence time but also to the time intervals of each signal period. Accordingly frequency shifts between transmission and reception by f→f(c−v)/(c+v). Since v<<c, the well-known expressions $$\frac{c \mp v}{c \pm v} \approx 1 \mp 2\frac{v}{c} \quad (3.7)$$

hold with high accuracy. In particular it follow that when object are with an interval $-v_{max} \le v \le v_{max}$ the Doppler spreading of instantaneous bandwidth becomes limited to $\Delta f_{Dopp} = 4 f_i v_{max}/c$. Again consider the automotive example in which higher relative speed than $V_{max} = 100$ m/s will not occur. For radar operating around 30 GHz a Doppler bandwidth limitation of $\Delta f_{Dopp} = 40$ kHz is obtained.

To analyze $\Delta f_{del}$ say that objects within some maximum range $R_{max}$ are required to be registered. The following relation must consequently hold $$\Delta f_{del} \approx \frac{2R_{max}B}{cT_{dyn}}B \approx \frac{2R_{max}B}{c}\sqrt{\frac{2a_{max}}{\lambda}} \quad (3.8)$$

Assume for the example $R_{max} = 300$ m. It follows that $\Delta f_{Del} = 280$ kHz. Adding delay, dynamic and Doppler bandwidth found for the example $B_i = 429$ kHz are found for (3.6). The number of possible quasi orthogonal channels in the example is thus $B/B_i = 2\,300$.

In summary, with the one limitation that surveillance range is limited, the fixed chirp rate QOW signal sets offers crucial advantages as regards realization of hardware and processing. It still allows a high number of channels across the radar band. It should be mentioned that utilization of the method requires strict synchronism regarding chirp rates, i.e. that a common time T is adhered on a "phase locked" principle. A practical aspect may be that this synchronism is obtained by independent users locking to GPS, as a common time base. The sweep delay constant τ is picked at random or may even be set to zero in any case other than radars mounted in the intermediate vicinity of each other. The probability of mutual interference between any two radars—meaning that radar signals intended to be orthogonal partly coincides is then 1/2300≈0.05%. Consequently it might happen that occasionally mutual interference does occur. A suitable mitigation step by changing the LFM signals delay τ by some random scheme after intervals of a few recurrence periods. Hence even if cases of mutual interference do occur, the time during which this situation prevails will just be those few recurrence periods.

System Layout and Processing.

This section addresses the several aspects of a radar in which the transmit and receive signal are non-orthogonal and also exploiting exceptionally large recurrence times.

Saab has devised the concept of "Continuous Arbitrary Waveform"—for short CAW—radar in order to improve radar cohabitation with other ether services. Basic to the concept is that transmit receive isolation is achieved by cancellation and not filtering (in the time or frequency domain for pulse and FMCW radars). Cancellation is noted to be a linear process, whereas filtering is a multiplicative. In CAW a replica of the transmit signal leakage into the receive channel is subtracted from the received signal. There are at least two challenges in realizing this idea. One is that while the transmit signal itself is perfectly known, its leakage will be affected by unknown and probably complex transfer characteristics of the "leakage channel". These characteristics have to be established by calibration and represented by a filter. Since the characteristics have a complex character only a digital filter will be able to truly represent them. Secondly, whilst the leakage can be mitigated to some extent by a suitable device suppressing antenna feed and reflections, residuals of these reflections will be magnitudes stronger than responses from far away objects to be ranged by the radar. While there is a requirement for a digital filter representing leakage characteristics, the actual cancellation of leakage must occur before digital conversion since the ADC dynamic range will probably be insufficient to represent the weak radar responses and leakage simultaneously. Rather by converting the digital representation of the leakage signal to an analog signal it is possible to perform cancellation in a 180° hybrid. Having thus reduced the dynamic span of the received signal it is AD converted.

Figure 4:
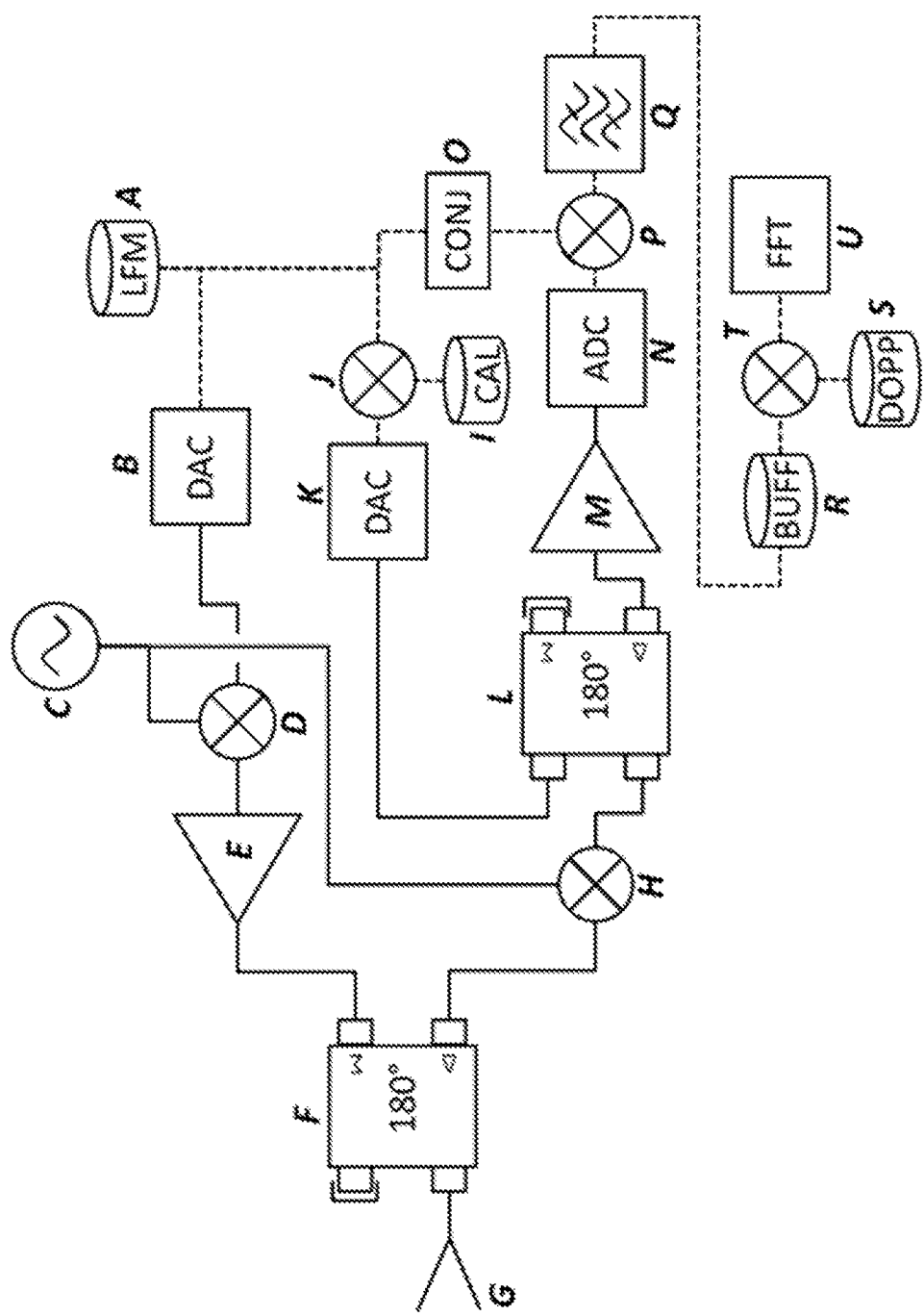
FIG. 4 shows a CAW radar schematics for LFM waveforms, with dotted lines representing digital and continuous lines representing analog signals.

In the particular case of the narrow instantaneous bandwidth LFM signals considered, they can be digitally down converted to zero baseband and band pass filtered to the instantaneous bandwidth. Such a filtering means a very large reduction of data rate. The reduced data stream is then pulse compressed by FFT techniques. Since the instantaneous bandwidth is small, compensating for the transfer characteristics varying across the radar band means compensating the incoming signal by a (complex) factor gradually changing from sample to sample (the set of numbers referred to as the transfer calibration vector). The overall CAW system for this particular application is illustrated in FIG. 4. Its different constituents can be explained as:

A. Frequency ramp generator. This must be accurate to keep channel separation. Requirements are probably easiest to satisfy as a digitally generated baseband sweep up-converted by a mixer and an oscillator at carrier frequency. The alternative is a very accurate VCO.

B. Power amplifier

C. 180° hybrid transmit/receive isolator. The antenna and a termination matching antenna impedance are connected to input ports. Transmit signal feeds to the E output while the receive signal comes from the A output. Antenna standing wave are thus cancelled in the receive signal up to impedance matching accuracy. By the hybrid arrangement the receive signal becomes isolated from the transmit signal.

D. Combined transmit/receive antenna

E. Subtraction of leakage signal in 180° hybrid

F. Digital memory feeding transfer calibration vector

G. Analog conversion to obtain baseband leakage signal replica

H. Mixer up converting calibration factors

I. Mixer down converting receive signal instantaneous bandwidth signal

J. Scaling to set leakage residual to ADC full scale

K. Conversion to digital
L. Recurrence time data buffer
M. Doppler shift phase adjustment signals
N. Doppler shift phase adjustment
O. FFT transform unit carrying out pulse compression and cycling for different Doppler shift bins Not shown in FIG. 4 are the methods for calibration. The basic approach to perform calibration, and thus to determine the calibration data in I, is to record data void of exterior radar responses. Alternatively the data could be obtained by collecting data for a number of different situations between which the exterior response will average out. In either the leakage replica feeding L will compensate also for imperfection in DA conversion and the hybrids, thus minimizing the entire deterministic and stable part of the leakage.

The methods for pulse compression are crucial for the possibilities to realize the technique. In particular it must be considered whether the resulting processing burden is sufficiently small to be handled by reasonably simple and low cost equipment.

Regard first a situation of a static scene, i.e. with objects non-moving. Only the situation of a single object (at range $r_0$) needs analysis as the situation of several objects follows by a mere summation of the linear expressions derived for the single object. For the single object received signal, the down conversion stage in P effects the transformation $$X(t) = Ce^{-i\frac{\pi B}{T}(t-\frac{2r_0}{c})^2 + 2\pi f_c(t-\frac{2r_0}{c})} \times e^{i(\frac{\pi B}{T}t^2 - 2\pi f_c t)} \overline{X}(t) = \quad (4.1)$$

$$Ce^{-i[\frac{4\pi B}{T}(\frac{r_0}{c})^2 + \frac{2r_0}{c}]}e^{i\frac{4\pi B}{Tc}tr_0} \approx Ce^{-i\frac{2r_0}{c}}e^{i\frac{4\pi B}{Tc}tr_0}$$

since $r_0/c \ll 1$. Note that the frequencies in the down converted signal are limited to $4\pi B R_{max}/cT$, which is very small compared to radar bandwidth $2\pi B$ (by a factor $cT/2R_{max} \approx 3500$ in the example). From (4.1) the band-limited sinc function point response from the object is obtained as $$\overline{X}(r) = \int_{-T/2}^{T/2} \overline{X}(t) e^{-i\frac{4\pi B}{Tc}tr} dt = C\frac{Tc}{2\pi B} \frac{\sin\left(\frac{2\pi B}{c}(r_0 - r)\right)}{r_0 - r} \quad (4.2)$$

The result directly generalizes to any collection of objects distributed in range, for which the range response profile is obtained by FFT transformation of the collected data $\overline{X}(t)$. Formally, and denoting by $f_\omega$ the FFT of the time signal $f(t)$ defined over the interval $[-T/2, T/2]$, one has $\hat{X}(r) = (Tc/2\pi B) \check{X}_{4\pi Br/Tc}$.

Consider now moving objects. As before, recurrence time has been selected according to (3.3), so during recurrence time constant speed v can be assumed. According to FIG. 3 the motion affects the time for reception of a recurrence period according to $T \to T(1+2v/c)$, while the instantaneous frequency is shifted $f \to f(1-2v/c)$. Moreover for a moving object the signal received at time t was transmitted at time $t_1 = (c-v)/(c+v)t - 2r_0/c$. Here $r_0$ is object range at "object time" zero, i.e. at the instant when $r_0 = ct/2 = -ct_1/2$. The Doppler shifted response of a moving object can thus be stated $$X(t) = Ce^{-i\left[\frac{\pi B}{T}(\frac{c-v}{c+v}t - \frac{2r_0}{c})^2 + 2\pi f_c(\frac{c-v}{c+v}t - \frac{2r_0}{c})\right]} \quad (4.3)$$

Down conversion yields the net phase. Since $v/c \ll 1$ and $r_0/c \ll T$ $$\Delta\Phi(t) \approx \quad (4.4)$$

$$\frac{\pi B}{T}\left(t - 2\frac{v}{c}t - \frac{2r_0}{c}\right)^2 + 2\pi f_c\left(t - 2\frac{v}{c}t - \frac{2r_0}{c}\right) - \frac{\pi B}{T}t^2 - 2\pi f_c t =$$

$$4\frac{\pi B}{T}\left(\frac{v}{c}\right)^2 t^2 + 4\frac{\pi B}{T}\left(\frac{r_0}{c}\right)^2 - 4\frac{\pi B}{T}\frac{v}{c}t^2 - 4\frac{\pi B}{T}\frac{r_0}{c}t +$$

$$8\frac{\pi B}{T}\frac{vr_0}{c^2}t - 4\pi f_c\frac{v}{c}t - 4\pi f_c\frac{r_0}{c} \approx$$

$$-4\frac{\pi B}{T}\frac{v}{c}t^2 - 4\pi\frac{B}{Tc}\left[\left(1 + 2\frac{v}{c}\right)r_0 - \frac{f_c}{B}Tv\right]t - 4\pi f_c\frac{r_0}{c}$$

The square bracket in the final expression in (4.4) gives rise to a range-velocity ambiguity in the down conversion result $\check{X}(t)$ obtained from $X(t)$ in (4.3). Indeed preform a Fourier transform on $\check{X}(t)$ just as in (4.2). If the $t^2$-term in (4.4) stays small throughout the integration it can be neglected. The condition is clearly $$4\frac{\pi B}{T}\frac{v}{c}\frac{T^2}{4} \leq \frac{\pi}{4} \Rightarrow v \leq \frac{c}{4BT} \quad (4.5)$$

A moving object obeying this condition will be positioned at range $$r = r_0 + 2\frac{v}{c}r_0 - \frac{f_c}{B}Tv \quad (4.6)$$

Hence, not knowing object speed the range cannot be uniquely determined. The term $2vr_0/c$ is extremely small and negligible though $f_c T/B$ is generally not so. However if object speed is sufficiently high to violate (4.5) the object will be defocused or perhaps not even detectable by performing the Fourier integration (4.2). For such object the down conversion may be adjusted by digitally performing the frequency shift $\check{X}(t) \to e^{-i\Delta\Phi}\check{X}(t)$ with $\Delta\Phi$ determined by (4.4) and the Fourier transforms carried out for every multiple of c/4BT. Velocity is thereby determined from the velocity channel providing maximum response. The residual range uncertainty is thereby set by the velocity uncertainty $\Delta v = c/2BT$ obtained as in (4.5). Hence range uncertainty is limited to $$\Delta r = \frac{f_c}{B}T\Delta v = \frac{f_c}{B}\frac{c}{2B} \quad (4.7)$$

The fractional bandwidth $B/f_c$ is noted to be crucial for range accuracy. For the automotive example $\Delta v = 21$ m/s is obtained. Thereby $\Delta r = 4.5$ m with $B/f_c = 1/30$ and resolution c/2B=0.15 m. In practice, reducing the width of the velocity channels to some fraction of c/2BT improved speed estimates is possible just by selecting the velocity channel of maximum response. The improvement depends on the strength of the response compared to thermal noise, and will thus to a high degree depend on the signal-to-noise ratio of the radar response. Thus for objects close to the radar or large objects further away the accuracy improvement will be significant. For instance, allowing for an improvement to $\Delta v \approx 4$ m/s and $\Delta r=0.9$ m the required number of velocity channels becomes $2v_{max}/\Delta v=2\times 100/4\approx 50$.

It is important to understand that the capability to discern two objects moving closely to each other in speed and range is not limited by (4.7). Indeed the objects can be discerned the range velocity plane as long as the difference between the expressions (4.6) for the two objects is larger than the bandwidth limited range resolution. Thereby it can be concluded that there are two objects though the actual position remains subject to the condition (4.7) however. Hence resolution, in the sense of the ability to discriminate object closely separated objects, remains bandlimited.

The processing burden can then be estimated. For each Doppler channel the integral (4.4) must be computed as a FFT. Since $B_i=429$ kHz and $T_{dyn}=0.007$ s there are $B_iT_{dyn}\approx 3000$ complex samples for each velocity channel and recurrence period. Each velocity channel corresponds to a frequency ramp adjustment of the 3000 sample row, performed before the FFT is applied.

Testing with Matlab on a capable CORE i7 laptop a 3000 point FFT is timed to 19.5 μs, implying that the 566 Doppler channels can be computed at a 90 Hz rate, i.e. slightly slower than at the current recurrence rate $1/T_{dyn}=141$ Hz. Processing in the radar can be set up to be pipelined with respect to the specific task at hand but must also be small and cheap in the type of automotive applications considered.

These results also allow an analysis of the cross correlation (corresponding to (3.5)) for the LFM QOW set considered. Regard the cross correlation for a signal signified by $\tau=v=0$ and any other signal. In this case for the phases $\Phi_0(t)$ and $\Phi_{\tau,v}(t)$ of the two signals $$\Phi_{\tau,v}(t) - \Phi_0(t) = \frac{\pi B}{T}\left(1 - 2\frac{v}{c}\right)(t-\tau)^2 - \frac{\pi B}{T}t^2 - 4\pi f_c \frac{v}{c} t \approx \\ -2\pi\left(\frac{B}{T}\tau - \frac{2f_c}{c}v\right)t - \frac{2\pi B}{T}\frac{v}{c}t^2 \quad (4.8)$$

The cross correlation (3.5) then assumes the form $$C_{v,\tau} = \left|\frac{1}{T}\int_{-T/2}^{-T/2} e^{-i2\pi\left[\left(\frac{B}{T}\tau - \frac{2f_c}{c}v\right)t - \frac{B}{T}\frac{v}{c}t^2\right]} dt\right|^2 \quad (4.9)$$

The stationary phase method allows an approximate assessment for (4.9). Form first and second order time derivatives of (4.8)

$$\left[\left(\frac{B}{T}\tau - \frac{2f_c}{c}v\right)t + \frac{B}{T}\frac{v}{c}t^2\right]' = \left(\frac{B}{T}\tau - \frac{2f_c}{c}v\right) + 2\frac{B}{T}\frac{v}{c}t = 0 \quad (4.10)$$

$$\left[\left(\frac{B}{T}\tau - \frac{2f_c}{c}v\right)t + \frac{B}{T}\frac{v}{c}t^2\right]'' = 2\frac{B}{T}\frac{v}{c}$$

According to the first expression, the phase will be stationary at and around the time $$t' = -\frac{\frac{B}{T}\tau - \frac{2f_c}{c}v}{2\frac{B}{T}\frac{v}{c}} = -\frac{1}{2}\left(\frac{c}{v}\tau - \frac{2T}{B}f_c\right) \quad (4.11)$$

Since $|t|\leq T/2$ then there is limit to the time shifts allowing this to happen. Indeed $$-\frac{T}{2} \leq -\frac{1}{2}\left(\frac{c}{v}\tau - \frac{2T}{B}f_c\right) \leq \frac{T}{2} \Leftrightarrow \frac{T}{B}\frac{2v}{c}\left(f_c - \frac{B}{2}\right) \leq \tau \leq \frac{T}{B}\frac{2v}{c}\left(f_c + \frac{B}{2}\right) \quad (4.12)$$

In the example $\tau \approx 3\times 10^{-7}$ is obtained for the offset causing interference—a time shift corresponding to an adjacent channel much closer than the frequency separation set by bandwidth $B_i$ of (3.6), and is thus of no concern. The cross correlation phenomenon is noted to concur with the lower plot of FIG. 1, i.e. that frequency ramps become inclined (due to different Doppler shifts) at slightly different angles and thus intersects. While the possibility of such intersection has been ruled out by the $B_i$ channel separation, if it would have been allowed to happen the interference level caused would have been high. Indeed, when (4.12) is satisfied, the integral acquires net amplitude for times t around t' subjected to $$\Delta\Phi = \frac{B}{T}\frac{v}{c}(t-t')^2 \leq \frac{\pi}{2} \Rightarrow |t-t'| = \sqrt{\frac{\pi}{2}\frac{T}{B}\frac{c}{v}} \quad (4.13)$$

Applied to the automotive example |t–t'| values of the order T can be obtained, i.e. the cross correlation can be of unity order.

For any other selection of $\tau,v$ cross correlation will be small. Indeed the rapid oscillation of the time quadratic term in the phase of the integrand in (4.9) will make cross correlation outside the condition (4.12) smaller if $v\neq 0$ than if $v=0$. Consider therefore the latter case. Then from (4.9) and within a single recurrence period $$C_{0,\tau} = \left|\frac{1}{T}\int_{-T/2}^{-T/2} e^{-i2\pi\frac{B}{T}\tau t} dt\right|^2 \leq \left(\frac{1}{\pi B\tau}\right)^2 \quad (4.14)$$

Note that (4.14) does not apply to full transmit signals which are based on continuously repeating the transmit frequency ramp. Then one further and inevitable source of leakage is the restart of the frequency ramps. To minimize its effect, this should occur instantaneously, i.e. with duration 1/B. Then its instantaneous bandwidth will agree with the full radar bandwidth B. Only the fraction $B_i/B$ of the power spread across the full bandwidth will contribute to the cross correlation (as defined in (3.6)). Thus the start correlation contribution between radar channels becomes $B_i/TB^2$. With $B_i=429$ kHz for the example, the contribution is of the order –100 dB. By comparison, with $\tau$ set by $B_i$ according to $\tau=TB_i/B$, the sweep correlation contribution will be of the order –80 dB. Thus adjacent channel correlation is the dominant challenge leakage term, which however still is an improvement on random signal leakage 1/TB of the preceding section.

Incidentally note the frequency separation $\Delta B=B\tau/T$ required for LFM signals to obtain cross correlation of 1/TB order.

$$\left(\frac{1}{\pi B\tau}\right)^2 = \frac{1}{TB} \Rightarrow \tau = \frac{1}{\pi}\sqrt{\frac{T}{B}} \Rightarrow \Delta B = \frac{B}{T}\frac{1}{\pi}\sqrt{\frac{T}{B}} = \frac{1}{\pi}\sqrt{\frac{B}{T}} \quad (4.15)$$

Evidently the expressions is similar to the one in (3.4), derived from the instantaneous bandwidth argument. Of course actual channel separation must also take Doppler widening and delays into account, as was discussed in section 3. The wider separation required is what further reduces the channel cross correlation.

The main parameters obtained for the automotive example is found summarized in Table 1.

Methods are described enabling low frequency ultra wide band foliage penetration (FOPEN) radar signals to be notched at the precise frequencies of conflict with in-band wireless services. The goal is that radar transmit power levels should be on par with environmental noise for receivers of these services, implying that no degradation of the services will be perceived.

Introduction

Whilst microwave SAR is an important tool for ground surveillance it has little or no capability to penetrate vegetation or military camouflage. To circumvent this shortcoming, the radar must be made to operate at frequencies in the VHF or UHF band, rather than in the conventional microwave bands. Since high resolution (at least of the same order as target size) remains a requirement foliage penetration radar must operate at large fractional bandwidth. For instance, the Swedish CARABAS III radar (developed by Saab) uses the full frequency bands 25-90 MHz and 140-360 MHz for a "lower" and "higher" frequency radar mode. Hence, as a rule of thumb, bandwidth must be of the same order as center frequency.

Figure 5:
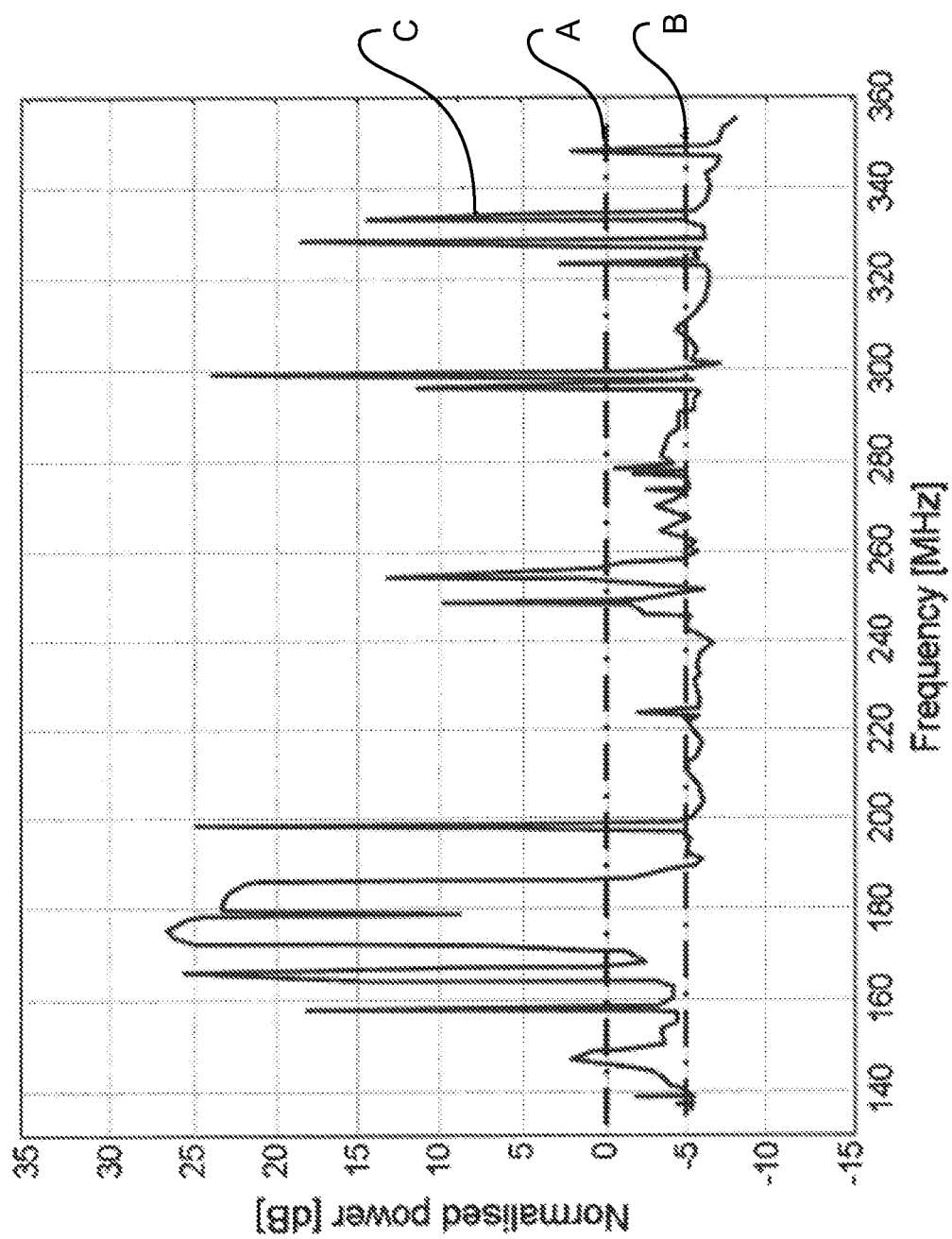
FIG. 5 shows a typical frequency conflict.

The issue to be discussed is that the frequency requirements for foliage penetration (henceforward FOPEN) come in conflict with the established usages of the electromagnetic spectrum, e.g. communication and radio navigation. Due to the intense use of the electromagnetic spectrum, there will always be several such services occurring within the bandwidth required for FOPEN (a typical situation is shown in FIG. 5, showing a typical frequency conflict. Line A is the level of CARABAS III received signal, line B is the median level of environmental noise and line C is the actual spectrum showing peaks due to communication and digital TV). However communication and radio navigation are all narrow band, and the total bandwidth of conflicting transmissions will be small compared to the radar bandwidth itself. Consequently the resulting degradation of the SAR image will be relatively small and can generally be tolerated. A requirement is that the radar receiver is sufficiently linear (around 80 dB for the CARABAS III) so that notch filtering of interferers can be carried out without any significant receiver noise increase.

The reversed issue of the FOPEN radar impacting in-band wireless services is more serious, since it may in fact be prohibitive to legal use of FOPEN radars. A mitigating factor is that, transmit power requirements for FOPEN is modest (10 W peak power is used in CARABAS III) and the transmit bandwidth is large. Therefore the transmit power density will be small (1 mW in a 100 kHz communication band).

Relevant to the discussion—and on the positive side for FOPEN radar usage—is the ever increasing congestion within the perhaps 10 GHz span of the electromagnetic spectrum which is best suited for earthbound wireless services. Splitting of wireless services by strict frequency separation will in the long run become impossible and spectrum must be shared using intelligent modulation which makes the best use of temporarily free frequencies whenever and wherever these are found.

Required Transmit Notch Depth

To find requirements for notch depth one notices that a ground-to-ground communication set up preferably adopts antennas with gain suppressing signals from the sky. The radar signal may either be captured by a far off communication receiver, with high directivity towards the horizon, or a receiver with a low gain/low directivity antenna, but where the radar is more or less above the receiver. Some analysis shows that the worst case is the latter. Sufficient notch depth can be stated $$kT_{ENV}B_I = \frac{1}{\gamma} \frac{A_E}{4\pi H^2} \frac{P_{TX}}{\eta(B_I/B)}. \tag{1}$$

Here k is Boltzmann constant, $T_{ENV}$ is the environmental noise temperature, which depends on location, frequency, time of the day and so forth. Worst case numbers (for urban environment, cf. [1]) are $T_{ENV}=3\times10^{5\circ}$ K at 50 MHz and $T_{ENV}=6\times10^{4\circ}$ K at 200 MHz The low gain victim antenna effective area is $A_E=\lambda^2/2\pi$. Moreover $B_I$ is instantaneous bandwidth, B is radar bandwidth, $\gamma$ is notch depth, $\eta$ is transmit duty cycle, $P_{TX}$ is mean transmit power and H is platform altitude. Sufficient notch depth is consequently $$\gamma = \frac{B}{kT_{ENV}B_I^2} \frac{\lambda^2}{8\pi^2H^2} \frac{P_{TX}}{\eta}. \tag{2}$$

Radar transmissions are very commonly adopting linear frequency modulation (LFM). For a LFM signal, denote by $\Delta t_{TX}$ the time during which the instantaneous bandwidth hits a certain frequency. Let $t_{TX}$ be the radar transmit time. The relation $B_I\Delta t_{TX}\approx1$ implies the formulas $$\Delta t_{TX} = \frac{t_{TX}}{\sqrt{t_{TX}B}} \tag{3}$$

$$B_I = \frac{B}{\sqrt{t_{TX}B}}$$

Combining (2) and (3) and noting PRF=$\eta/t_{TX}$ for the radar PRF (the PRF is best considered the pulse recurrence frequency, i.e. the time it takes for it to be spread over the signal bandwidth—periodicity is not required)

$$\gamma = \frac{1}{kT_{ENV}} \frac{\lambda^2}{8\pi^2H^2} \frac{P_{TX}}{PRF}. \tag{4}$$

Note the inequality PRF≤$1/t_{TX}$≤B. Hence $$\gamma \geq \frac{1}{kT_{ENV}} \frac{\lambda^2}{8\pi^2H^2} \frac{P_{TX}}{B}. \tag{5}$$

The CARABAS III radar is currently used in the light helicopter Schweitzer 300C and bound to operate at altitudes lower than 1000 m, because of the weak capabilities of this platform. However the 10 W peak power of the transceiver itself allows use at considerably larger altitudes, with greater standoff ranges. Typical radar operation can be from a slow platform at perhaps 5000 m altitude, with 10% transmit duty cycle and 10 kHz PRF. From (4) the notch depth requirement becomes 55 dB for the lower band (5 m wavelength) and 50 dB for the higher (1.25 m wavelength). The theoretical lower limits (from (5)) are 18 dB and 6 dB respectively, which requires a transmit signal which always instantly randomizes across the entire radar bandwidth. Of course no such signal is known. Usually the inequality PRF≤B is far from approaching equality.

The interference perceived in an actual victim receiver is also dependent on the bandwidth of this receiver. If the receiver bandwidth is smaller than the PRF then the fluctuation of impacting radar transmission due to pulsing and frequency sweep will not be sensed; it is only the mean transmit power which impacts the receiver and (5) applies for this type of receiver. If the receiver bandwidth is larger but still smaller than the instantaneous bandwidth, only the corresponding fraction of the impacting interference will be captured by the receiver. For the CARABAS III example, from (2) $B_I$=3 MHz, while typical communication receivers have a reception bandwidth of 30 kHz. Hence the power impacting these will be reduced by 20 dB meaning that a notch depth of 36 dB for the CARABAS III lower band and 30 dB for the higher band will make radar transmissions unnoticeable. Finally for victim receivers with receive bandwidth larger than 3 MHz the analysis above applies in full. Examples of such receivers are digital TV. For instance, for the European DVB-T/T2 standard, the bandwidth is 8 MHz, so these TV receivers constitute an example in this category.

These conclusions and the analysis above were corroborated by a study made by University of Bristol on the issue of FOPEN radar and communication cohabitation in the EDA Study SIMCLAIRS [2]. UoB specializes in propagation simulation for communication, and have for this purpose fully validated simulation modes, which was used to test the impact of un-notched CARABAS signals on DVB-T/T2 OFDM. The impact was surprisingly noticeable, even though radar signal power levels were below the threshold for noise suppression by the error correction used in the DVB-T/T2 technique. It was discovered that the success of the error correction was critically depending on the degree of randomization of the radar signal. In particular when radar signal sweep rate was slow the signal impact could be shown to cause a non-uniform impact, wandering through the DVB-T band, whilst the error correction demanded this impact to be randomized across the band.

Requirements on Notching Algorithm

Radar receive notching to remove narrow band interference is unproblematic. Given sufficient receiver linearity, interference is simply suppressed by performing a FFT on the received data and nulling the frequencies carrying the interference. To achieve notching of same frequencies on the transmit side is significantly more challenging:

1. In contrast to e.g. OFDM transmitters, which support complex amplitude and phase modulation, the large fractional bandwidth of FOPEN radar transmitters makes transmit linearity a difficult task. In fact the power amplifiers are best realized (being then also very straightforward and compact) operating in a saturated mode. Such transmitters support phase modulation (in particular the LFM waveform) well, whereas they flatten any amplitude modulation of the signal (even so, a pre-distortion technique of circumventing transmitter non-linearity for notching is known in the prior art.)

2. As will be demonstrated spectral notching is achievable to significant depth by novel waveforms having a non-monotonic frequency change. Spectral nulling is not possible for a monotonic frequency sweep.

3. The success of spectral notching also depends on duty cycle. In particular, and as will be exemplified, for notches of finite bandwidth the pulse side lobes of a small duty cycle signal will significantly limit achievable notch depths.

Denote by $\phi(t)$ the phase function of a phase modulated signal with unity modulus. For the signal to be band-limited $\phi(t)$ must vary smoothly in the sense that, within the signal band, the rate of change of the instantaneous frequency $\omega_t = d\phi(t)/dt$ is small over signal periods. Consider the Fourier coefficients $$c_\omega^F = \int_0^T e^{i[\phi(t) - \omega t]} dt. \qquad (6)$$

The integral can be approximated with a sum, each term corresponding to a time interval for which the phase of the integrand remains stationary These instances arise when $\omega$ agrees with instantaneous frequency, i.e. when $\omega_t = \omega$. For a monotonic phase sweep, there will just be one such instance for each $\omega$. In the general case there can be many. Enumerate these $t_\omega^{(n)}$, n=1, 2, . . . and the corresponding time intervals $T_n$. Hence $$c_\omega^F = \sum_n T_n e^{i[\phi(t_\omega^{(n)}) - \omega t_\omega^{(n)}]}. \qquad (7)$$

As a consequence, phase modulation by a monotonic frequency sweep (linear or not) leads to a non-zero modulus spectrum, with no ability to effective spectral notching. If the frequency change is non-monotonic, (7) evidently gives room to provide spectral notches by destructive interference among the several terms then making up $c_\omega$.

Apart from the transmit signal being non-monotonic, the requirements on the signal notching single frequencies are seen to be quite loose. An auxiliary requirement is however that an original un-notched waveform is given and spectral notches at selectable frequencies with selectable bandwidth should be obtained by modifying this waveform according to some efficient algorithm. A further requirement is that the insertion of any individual notch only should affect the waveform to the smallest possible extent. One reason for this is that the notch must not affect the spectral density of the signal, and thus degrade radar performance. Secondly, by this requirement, a new notch will not largely affect or destroy already existing notches. This is essential for finding waveforms in cases where massive notching is required.

Phase Ripple Method for Arbitrary Notching

As said, for individual frequencies there are many ways for achieving spectral notches by phase modulation. These methods leave open if there are better methods. In contrast, by the present "phase ripple" approach, the modification of the phase function is fully arbitrary. The requirement for notches to have minimum impact of the waveform makes this modification stand in a one-to-one relation with the frequencies to be notched.

Here an accurate time discrete presentation is provided, ending in the algorithms tested, with results accounted for in the subsequent chapter.

Let $\Phi$ and $\mu_k$ be real-valued time discrete functions with values $\Phi_n$ and $\mu_{k,n}$ given for the moments of time $$t_n = \frac{n}{f_s}; n = 0, 1, \ldots, N-1 \qquad (8)$$

Here $f_s$ is the sampling frequency. To (7) there is associated a set of orthogonal frequencies $$\omega_k = 2\pi \frac{k}{N} f_s; k = -\frac{N}{2}, -\frac{N}{2}+1, \ldots, \frac{N}{2}-1 \qquad (9)$$

Hence $\mu_{k,n}$ is a function particular for the frequency $\omega_k$. The phase ripple radar waveform is represented $$s_n = a_n e^{i(\Phi_n - \sum_{k \in K} c_k \cos \mu_{k,n})} \qquad (10)$$

Here, $a_n$ is an amplitude function. The case of a pulse signal will be allowed, assuming $a_n=1$ if $n \leq M$ and $a_n=0$ otherwise for some given $M \leq N$.

There will be one function $\mu_{k,n}$ for each $k \in K$, where K is the set of frequencies within (9) at which a notch is required. Henceforward $\mu_{k,n}$ will be referred to as phase ripple functions and $c_k$ as phase ripple coefficients. In order that the functions shall represent a phase ripple without any amplitude modulation, the coefficients $c_k$ are required to be real, which will be the case henceforward.

The number of notches, i.e. the set K of frequency numbers, can be large (it is of the order 1000 in several of the tests made) whereas the coefficients $c_k$ will be small (as will be seen in the sequel). In the cases of K large, a first order series expansion of (10) is a less good approximation. However the approximation $$s_n \approx a_n e^{i\Phi_n} \prod_{k \in K} (1 - ic_k \cos \mu_{k,n}) \qquad (11)$$

remains accurate, since it only depends on the smallness of $c_k$. For $n \leq M$, from (11)

$$a_n e^{i\Phi_n} \prod_{k \in K} (1 - ic_k \cos \mu_{k,n}) = \qquad (12)$$
$$a_n e^{i\Phi_n} X_{k'} (1 - ic_{k'} \cos \mu_{k',n}) \Leftarrow X_{k'} = \prod_{k \in K, k \neq k'} (1 - ic_k \cos \mu_{k,n})$$

For $n > M$ it is seen that $X_{k'}$ can assume any values.

The Fourier transform $\chi^F$ of the time discrete function $\chi$ is $$\chi_k^F = \sum_{n=0}^{N-1} \chi_n e^{-i2\pi kn/N} \qquad (13)$$

The notch requirement is $$s_k^F = 0 \Leftarrow k \in K \qquad (14)$$

from which it follows $$c_k = -i \frac{(ae^{i\Phi_n} X_k)_k^F}{(ae^{i\Phi_n} X_k \cos \mu_k)_k^F} \qquad (15)$$

Now $\mu_k$ is going to be found as the function which determines $c_k$ as the smallest possible real value satisfying (11). It is seen that $\mu_k$ is present in both the numerator and denominator. However since $c_k$ is small $X_k \approx 1$ so the requirement is approximately satisfied by making the denominator modulus maximally large. This is a requirement for stationary phase of the denominator, implying that the modification of the original phase function is actually an additional arbitrary function, defined as a Fourier series with $c_k$ being its Fourier coefficients. Thus (10) becomes $$s_n = a_n e^{i[\Phi_n - i \sum_{k \in K} c_k \cos(2\pi kn/N - \Phi_n + \alpha_k)]} \qquad (16)$$

Since $X_{k'}$ depends on all coefficients $c_k$; $k \in K$, the expression (15) constitutes an equation system for $c_k$. The system is heavily non-linear and cannot be solved by exact methods. An approximate second order "perturbation" solution can be obtained however. Assume initially that for each particular $c_{k'}$ the remaining coefficients $c_k$ are all zero. A set of first order coefficients $\hat{c}_k$, is determined, with $X_k=1$ exactly. The value of the denominator is the maximum value A. In the case M=N, i.e. that there is no pulse modulation $$(ae^{i\Phi} \cos \mu_k)_k^F = \frac{Ne^{i\alpha_k}}{2} + \frac{e^{-i\alpha_k}}{2} (ae^{i2\Phi})_{2k}^F \approx \frac{Ne^{i\alpha_k}}{2} \qquad (17)$$

In the case that M<N $$\hat{c}_k = -\frac{2ie^{-i\alpha_k}}{M} (ae^{i\Phi})_k^F \qquad (18)$$

The equation (14) will be satisfied (in the approximate sense) for any value of $a_k$. Since $$-i(ae^{i\Phi})_{k'}^F = |-i(ae^{i\Phi})_{k'}^F| e^{i \, angle[-i(ae^{i\Phi})_k^F]} \qquad (19)$$

choose $$\hat{\alpha}_k = angle[-i(ae^{i\Phi})_k^F] \qquad (20)$$

With the selection $\alpha_k = \hat{\alpha}_k$ in (17)

$$\hat{c}_k = -\frac{2}{M} |(e^{i\Phi})_k^F| \qquad (21)$$

Hereby $\hat{c}_k$ is real, as required.

Going to second order, the approximation obtained by (20) and (21) is used for the determination of $X_k$. From (12)

$$\hat{X}_{k'} = \frac{\prod_{k \in K} [1 - i\hat{c}_k \cos(2\pi kn/N - \Phi_n + \hat{\alpha}_k)]}{1 - i\hat{c}_{k'} \cos(2\pi kn/N - \Phi_n + \hat{\alpha}_{k'})} \qquad (22)$$

The corrected functions $\mu_k$, coefficients $c_k$ and angles $\alpha_k$ are then calculated according to $$\mu_k = 2\pi kn/N - \Phi_n + \alpha_k \qquad (23)$$

$$c_k = \left| \frac{(e^{i\Phi_n} \hat{X}_k)_k^F}{(e^{i\Phi_n} \hat{X}_k \cos \hat{\mu}_k)_k^F} \right|$$

$$\alpha_k = \hat{\alpha}_k + angle\left[ -i \frac{(e^{i\Phi_n} \hat{X}_k)_k^F}{(e^{i\Phi_n} \hat{X}_k \cos \hat{\mu}_k)_k^F} \right]$$

Experimental Verification

Figure 6:
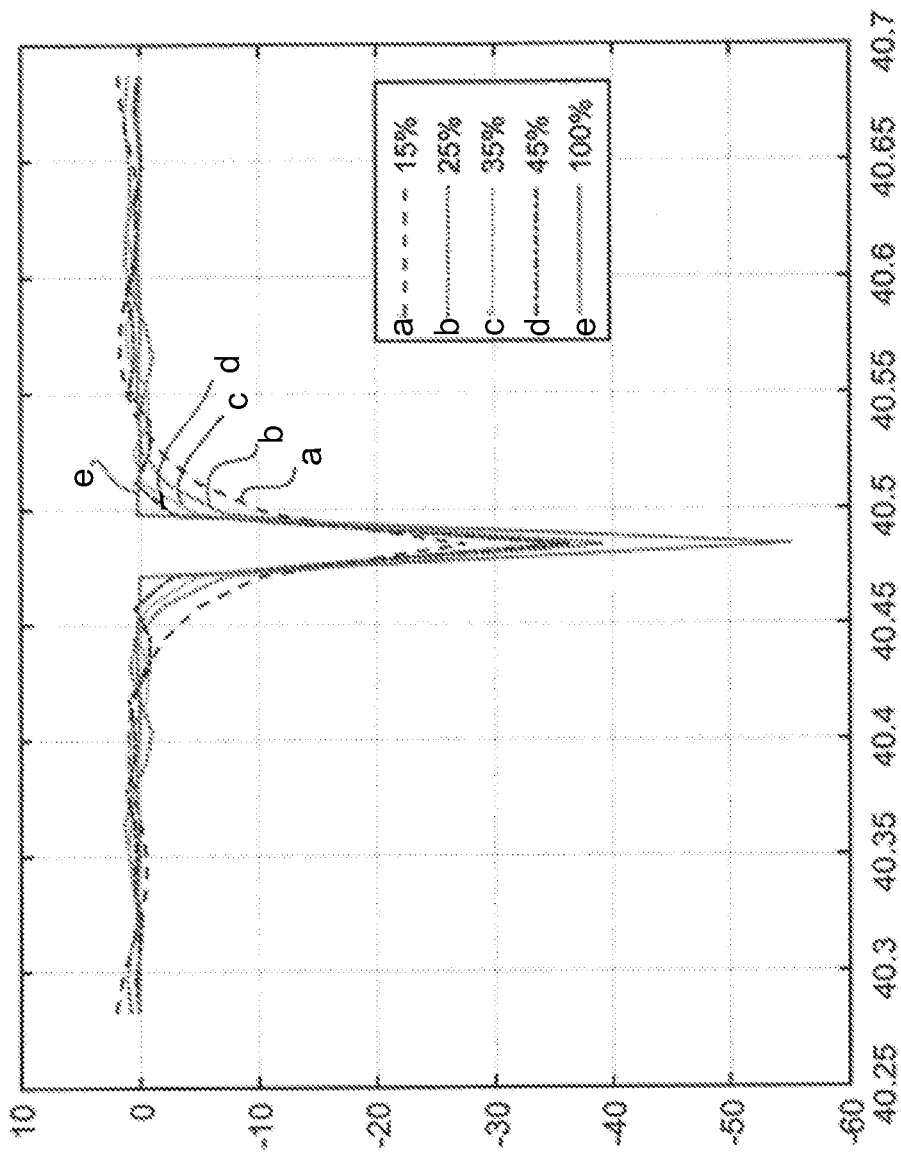
FIG. 6 shows single frequency notch depths for different duty cycles.
Figure 7:
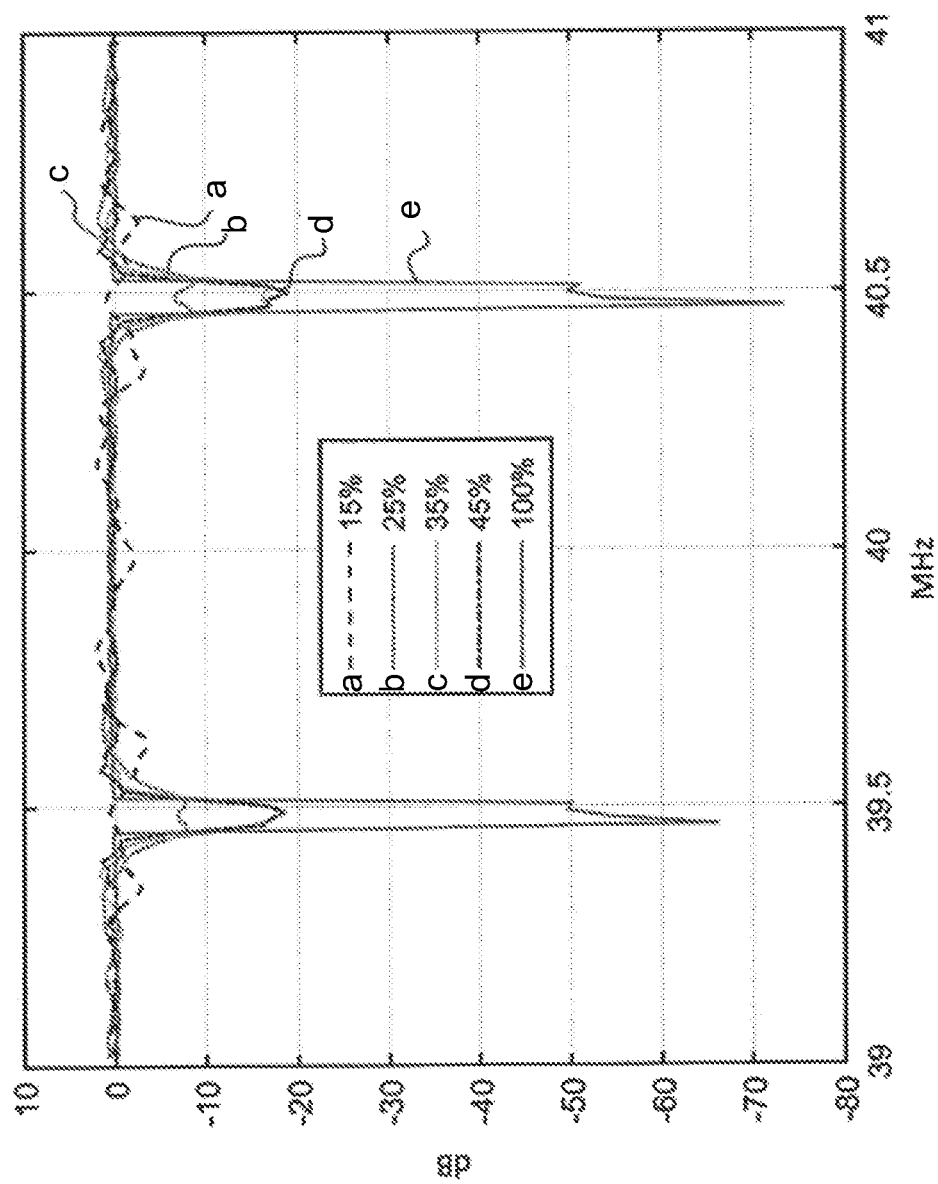
FIG. 7 shows notch depths for 40 kHz bandwidth and different duty cycles at two frequencies 1 MHz apart.

The notch method accounted for has been tested for the CARABAS III high and low bands. The majority of the tests have been with PRF set to 10 kHz—any crucial dependence on PRF has not been observed. Testing has encompassed digital tests as well as spectrum analyzer measurements, using the CARABAS III transceiver. The outcome of the tests may be summarized:

1. Achievable notch depths depend on duty cycle, bandwidth of the notch, and the total bandwidth of all notches. FIGS. 6 and 7 illustrate these dependencies. In FIG. 6 suppression depth for a notch at a single frequency point at 40.5 MHz is plotted, for duty cycle varying. In FIG. 7 the same is done, for the case of two frequencies notched—39.5 and 40.5 kHz. In this case there is a 40 kHz notch bandwidth. As is evident the combination of small duty cycle and a finite bandwidth severely degrades notch performance. The result is expected—the side lobes caused by pulse modulation around individual frequency points blocks the notching of neighboring frequency points thus causing a deadlock for notching across bandwidths larger than that of the individual frequency points.

2. The CARABAS III transceiver is designed for a maximum of 25% duty cycle, so power amplifier tests have been correspondingly limited. Measured degradation of notch depth was 1-2 dB, by passage through the power amplifier. The slight degradation is likely due to the amplifier phase non-linearity occurring at the onset of the waveform.

Figure 8:
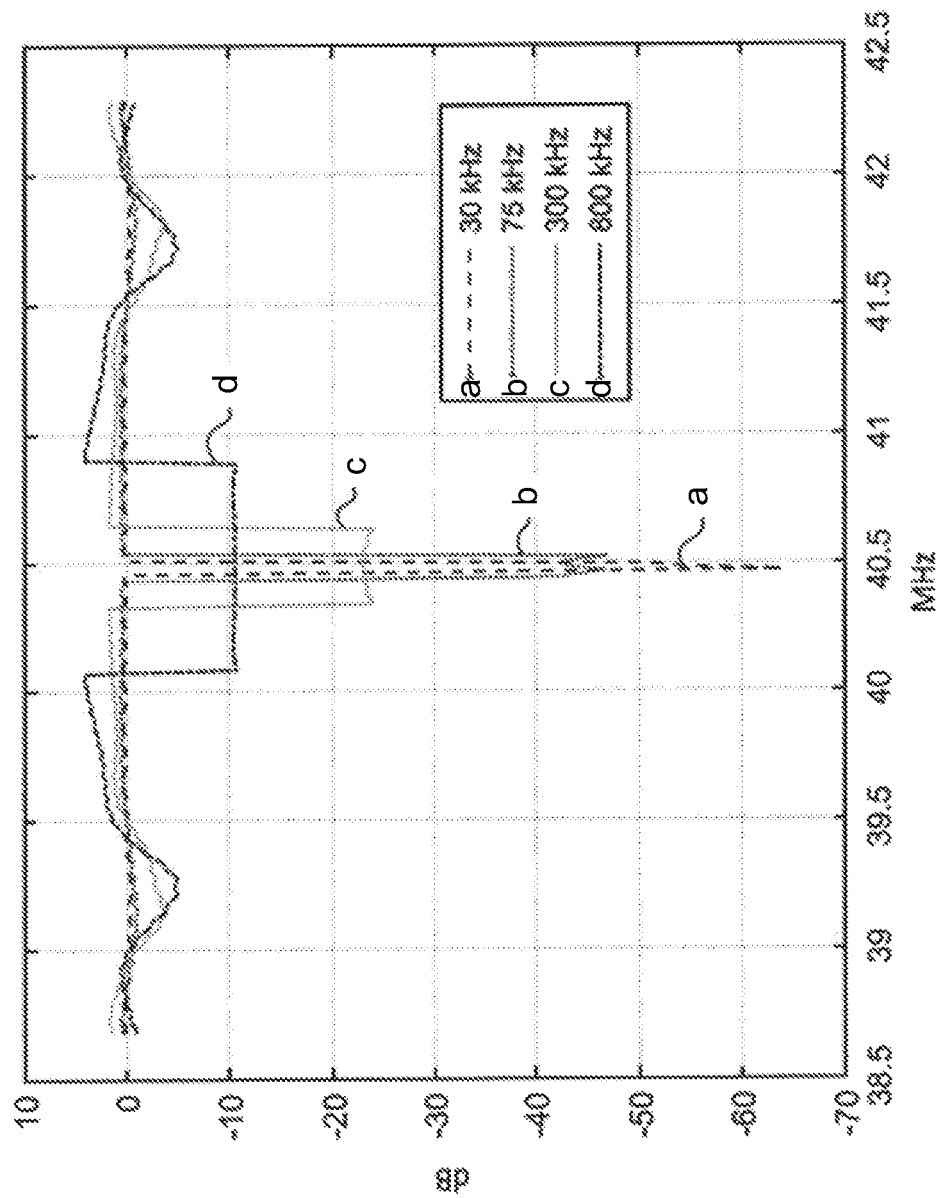
FIG. 8 shows notch depth at different notch bandwidths. 100% duty cycle
Figure 9:
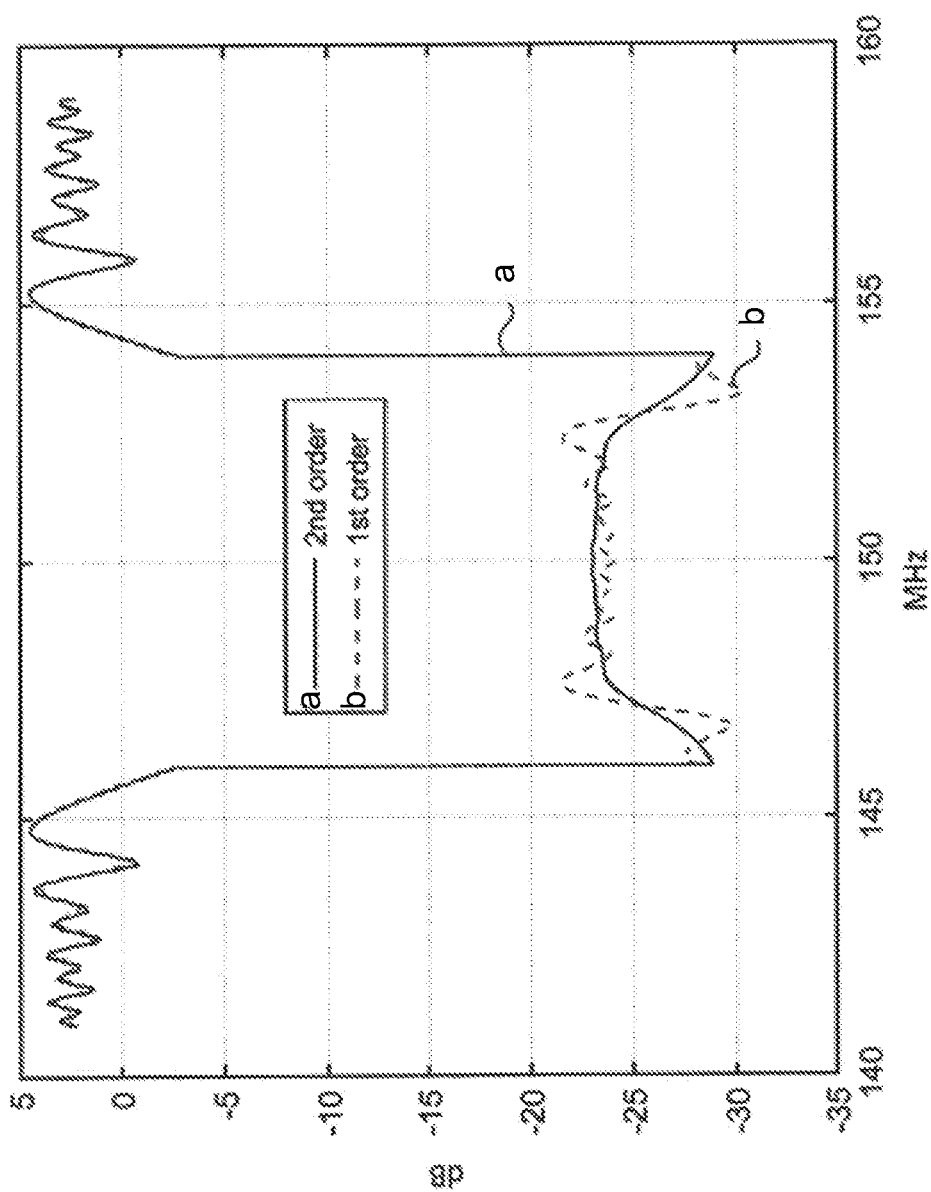
FIG. 9 shows 8 MHz notch fitting DVB-T/T2. 100% duty cycle and waveform notched making a frequency jump across notched bandwidth.

3. The 100% duty cycle was tested for increasing notch bandwidths and also increasing number of notches. Results for increasing notch bandwidth are shown in FIG. 8, indicating high performance for bandwidths 75 kHz and reasonable performance for bandwidths 300 kHz. For very large bandwidths like 8 MHz, required for DVB-T/T2, the method shows reasonable performance when applied to an initial waveform in which the LFM segments corresponding to the notched band, have been removed and the two remaining pieces joined (FIG. 9). The method has also been tested for notching 100 randomly dispersed frequencies in the CARABAS III high band, each with 100 kHz bandwidth. Suppression depths of around 28 dB are attained. It has been established that the second order correction of the phase ripple coefficients contributes about 10 dB in this suppression. In contrast, as is seen in FIG. 9, they do not affect suppression for the broad band notch. Similarly the second order corrections contribute little when duty cycle is short. The explanation seems to be that both cases involve discontinuities in the waveform parameters leading to sidelobes in the spectral domain. The deadlock of these sidelobes cannot be effectively circumvented, which makes the second order corrections ineffective.

Full Multiplex Radar

The firm conclusion from the foregoing discussion is that CW radar is much required for high performance notching in FOPEN radar. However, for the notched waveforms discussed here, the classic FMCW radar principle is not useful, since the band pass transmit/receive isolation depends on that the transmit signal is instantaneously narrow band. The phase ripple functions creating the notches are active for the entire signal length, i.e. 100 μs. And this is not a particular property of this notch method. For mathematical reasons notch widths $\leq \Delta f$ requires signal durations $\gtrsim 1/\Delta f$ Thus for notch widths of the order 10 kHz a signal duration of 100 μs is required, irrespective of method used.

Figure 10:
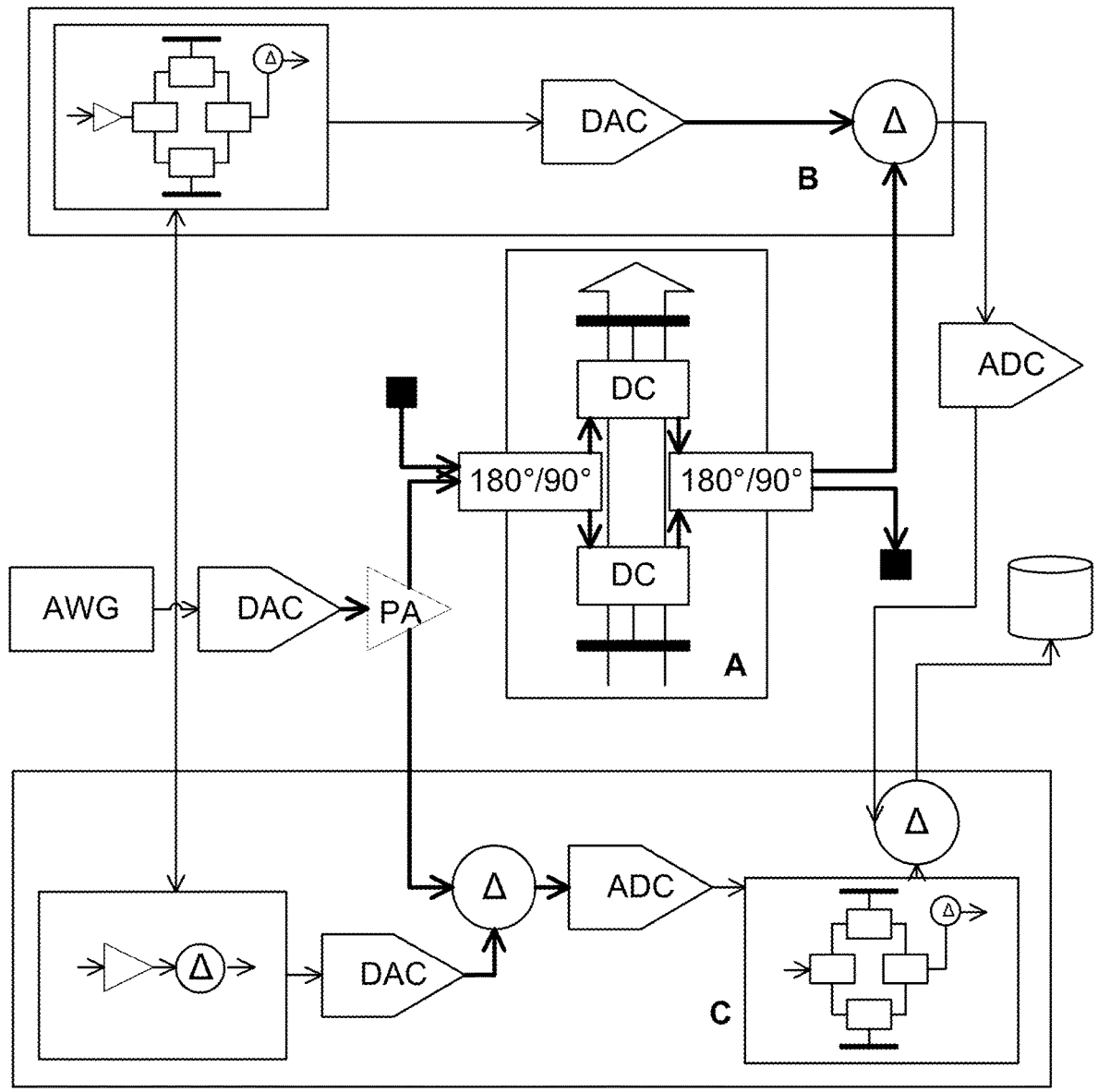
FIG. 10 shows an example of a CAW architecture. The transceiver is split up into three cancellation blocks operating successively on the received signals described in the text.

FIG. 10 shows the basic CAW (Continuous Arbitrary Waveform) radar transceiver, designed to enable transmit notching. Its principle is transmit/receive isolation by cancellation. It has similarities with the currently studied full multiplex communication concepts, in which the transmit signal is cancelled in the receiver chain, thus enabling signals incoming in-band, while transmitting. The FOPEN application is the greater challenge however, in occurring over an octave order bandwidth.

The basic approach for the system design is that it achieves isolation in three successive steps (corresponding to the three cancellation blocks A, B, C in FIG. 10):

1. An initial isolator cancellation (A) which is required to be highly linear and time stable, and thus accurately characterized by a digital model.

2. A second analogue cancellation step (B), which removes the analogue cancellation error of 1 with respect to the digital transmit signal, by making use of that this is accurately known and also that the analogue cancellation system characteristics are accurately known.

3. A third step of digital cancellation (C), removing the analogue cancellation error of 1 for the transmitter noise (including non-linearities) by making use of that this noise is of relatively low intensity and thus can be accurately AD converted.

For a narrow band system the filters involved would be a mere multiplication of the signals by complex numbers, with phase and magnitude adjusting the signal by the required gain and delay. Filters are complicated, since gain and delay must vary with frequency. For instance, antenna reflections involve a complicated frequency dependent interaction with the aircraft. However, in the design, this is allowable since the filters are fully digital, and the filter coefficients set by calibration.

As indicated in the isolator part in FIG. 10, each dipole pair is connected to transmit and receive channels through 90° hybrids. The dipoles are separated half a wavelength at center frequency. The phase shift and separation will provide the dipole pair with wide band directivity along the axis of translation and in the direction of phase delay, i.e. to one (selectable) side of the aircraft.

A prototype CAW transceiver is currently in development, This step has been preceded by laboratory trials, evaluating the potential performance of such a radar.

The experimental set up borrowed analogue components from the CARABAS III transceiver, combining these with high end digitizing equipment to realize the architecture in FIG. 10. The following system parameters were used in the experiments:

TX output power: 33 dBm
Frequency band: 130-350 MHz
Signal duration: 10 μs
Sampling frequency ADC: 800 MHz
Conversion rate DAC: 1600 MHz The outcome of the experiments was quite promising—in particular the required levels of leakage cancellation were reached. The isolation prior to pulse compression was measured to be 84 dB. A total isolation of 144 dB was obtained after pulse compression, corresponding to transmit signal noise leakage 23 dB above 300 K noise at the receiver input. The receiver internal noise (measured in the absence of transmission) was only 5 dB lower than this value.

The receiver internal noise of the conventionally pulsed transceiver of CARABAS III transceiver is 10 dB lower than the transmit signal noise leakage in the experiment. Memory limitations only allowed for 10 μs integration time, whereas 100 μs is the requirement for a proper system. According to the CAW principles this will improve transmit receive isolation by a further 10 dB making the CARABAS III and the CAW experimental transceiver performances essentially equal.

The CAW concept was originally developed as a Saab proprietary effort. The experimental verification was executed by Saab and the Swedish Company SP Devices within the EDA study SIMCLAIRS.

As previously mentioned WO 2011/102762 A1 describes frequency orthogonality achievable with slow frequency sweep FMCW radar. The slow frequency sweep was combined with the so called CAW technique performing subtractive leakage cancellation rather than frequency filtering, thereby allowing arbitrarily slow sweep rates and down to zero range performance. An enabling factor for slow frequency sweeps was the resolution of the range Doppler ambiguity of FMCW radar from quadratic time phase terms arising due to target motion. Unless resolved the range Doppler ambiguity becomes particularly serious as the slow frequency sweeps are required for a high degree of waveform orthogonality.

In applications in which the radars are used as a means for vehicles attempting to move in unison there is clearly a necessity for radar signal orthogonality since the radars will frequently be illuminating each other. To make efficient use of the very limited frequency space available the orthogonality must pertain to radars operating at the same band, in which case the slow sweep methods mentioned offers a solution.

However, the post facto establishment of vehicle motion by measurements (with radar or any other means) put limits to the efficiency and smoothness of vehicle guidance. Indeed it is the capacities of anticipation and imagination of a human driver which (at the best of times) makes traffic flow smoothly in congested situations. For guidance systems in autonomous vehicles, or for assisting human driving, a corresponding premonition of vehicle movements is required. It can be achieved if the sensor data, as well as any activity in changing vehicle state of motion, is communicated to surrounding vehicles. These will then be able to respond without waiting for motion changes to develop to a degree which can be measured. Hence there is a need for a vehicle-to-vehicle communication network—a vehicle guidance requirement which has been recognized for a long time. The obstacle has been to agree on convenient and affordable standards to establish such. Since the very idea of the communication network is to remove any latency in which vehicle adapt to each other, mobile phone networks are not an option. To avoid a further wireless system in the vehicle and since vehicle radar today becomes common, the obvious way ahead is to include in the radar function the communication capability required.

There are thus two main requirements on vehicle radar namely 1) that radar signals between individual radar units are orthogonal in the sense that the radar measurements performed do not interfere with each other and 2) that the radar signals contain a communication channel, which is shared by all vehicles in the vicinity of each other, in which vehicle status can be broadcast and vehicle status from surrounding vehicles received.

While radar utilizes large bandwidth—1 GHz will be assumed here—the required communication can be quite narrow band—say of the order 10-100 kHz. There are of course many different ways in which the radar signals can be modulated to be endowed with such a narrow band communication channel. Some of these falls short for the fact that radar signals should be coded not to interfere with one another. Thus any narrow band modulation to the radar signals would go unnoticed by the radar units in the vicinity due to the radar signal orthogonality, and thus offers no solution. Other conceivable methods are to interleave radar signals with various forms of wide band short pulse communication. Such communication ongoing between multiple transmitters and receiver will however call for synchronization rules which can be difficult to implement and keep robust. The one really suitable method for communication seems to be to select for communication a fixed frequency channel within the radar band. The loss of radar bandwidth in doing so is totally negligible.

Quite critical for this possibility a deep notch has to be imposed on the transmitted radar signal across the selected communication band, in order to free it from the radar transmission. To obtain a good quality narrow band notch a sweep rate significantly smaller than notch bandwidth (i.e. 10-50 kHz) should be utilized. The slow rate CAW radar waveforms (with a sweep rate of perhaps 200 Hz) are ideal for this purpose.

2. Proposed Solution

The hardware layout for the communication extended CAW radar encompasses the original scheme but with additional components inserting transmission of communication in the radar transmit chain, and reception of communication in the radar receive chain. The communication capacity is thus obtained by parallel transmission and reception in one small allotted frequency band, with the transmit-to-receive leakage cancelled, just as for the radar function. This technique of parallel transmission and reception with leakage cancellation is in communication known as "full multiplex". For communication its motivation is usually to reduce the required communication bandwidth by a factor of two. This advantage is however hampered by the difficulties preserving high dynamic resolution in the cancellation process. The modulation techniques providing optimum channel capacity (e.g. high order OFDM waveforms) are thereby not suited for full multiplex. In the present context, there is plenty of bandwidth available for the quite modest communication demands. Hence modulation could be selected not to stress dynamic resolution—FM modulation is one such option.

Figure 11:
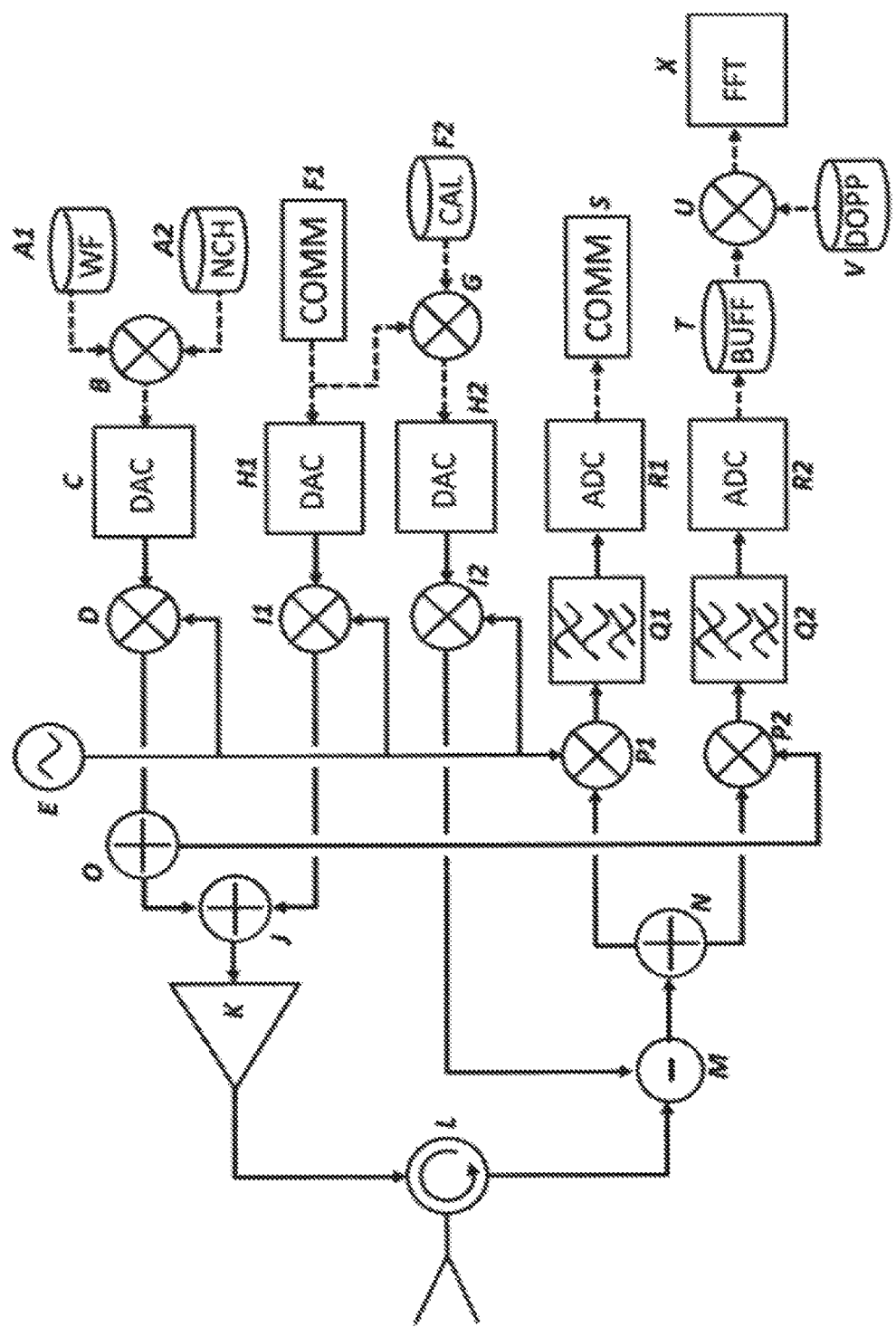
FIG. 11 shows a communication augmented CAW radar schematics, having a layout with cancelation only pertaining to communication channel, where dotted lines represent digital signals and continuous lines represent analog signals.

There are two variants of the same basic layout. FIG. 11 depicts one in which cancelation only acts on the communication receive channel. For the radar signal the leakage will have a very small frequency shift due to the slow frequency ramp, meaning that in principle leakage can be removed by band pass filtering. Performing the filtering prior to ADC conversion relives the ADC dynamic range requirement, just as cancellation does. However radar performance may be hampered in this set up. Indeed, the band pass filtering and its matching to the ADC converter require active components for which dynamic range and noise factor requirements could be difficult to meet. In the layout in FIG. 12, cancellation also acts on the radar signal thus reducing leakage amplitude prior to filtering, thereby relaxing these requirements.

The generic constituents of the extended CAW design are in the case of FIG. 11:

A1. Digital record of slow sweep radar waveform.

A2. Digital record of notch modulation of radar waveform (either purely phase modulated or with minor amplitude modulation).

B. Multiplication of A and B.

C. DA-converter taking the digitally modulated frequency sweep into an analog signal.

D. Mixer taking this signal to the radar band.

E. Local oscillator at frequency matched to the digital representation of the communication ad radar signals, thus providing the intended center frequencies for these.

F1. Communication signal—typically a digital data stream appropriately modulated.

F2. Filter parameters characterizing leakage, obtained by measuring communication test signal.

G. Digital multiplication to make communication signal equal leakage.

H1. Analog conversion of communication signal.

H2. Analog conversion of leakage signal.

I1. Up-conversion of radar signal to carrier frequency.

I2. Up-conversion of communication signal to carrier frequency.

J. Combination of radar signal and communication signal inserting communication signal in spectral notch of radar signal.

K. Power amplifier.

L. Antenna and circulator—the latter limiting leakage amplitude.

M. Subtraction of leakage in 180° hybrid. Note that it is the communication leakage which is subtracted. There is also leakage from the radar signal which however is notched at the communication frequency. The radar signal leakage at the communication band is thus small since the radar signal is either at another instantaneous frequency or notched.

N. Power dividing the received signal in a hybrid with one branch for communication and another for radar.

O. Splitting of radar sweep prior to power amplification, with one branch for down conversion of signal into radar branch.

P1. Down conversion of received signal in communication branch.

P2. Down conversion of received signal in radar branch. Down conversion occurs with the frequency sweep endowed with a weak phase ripple, the latter causing weak side lobes outside the instantaneous bandwidth. Note the fact that the phase ripple notch is only sensed a notch when time averaged over time intervals Δt corresponding to the passband filtering across the notch bandwidth, i.e. notch $\Delta t \approx 1/B_{notch}$. Hence, the phase ripple signal fed to the mixer is constant in amplitude in spite of the notch, sensed in band pass filtering for the communication band.

Q1. Signal in communication branch low pass filtered to communication bandwidth.

Q2. Signal in radar branch band pass filtered to radar instantaneous band width. Very important, the leakage of the radar signals shows up as low harmonics (less than 1 kHz), for of the frequency sweep frequency (typically of the order 100 Hz). These are significantly smaller than the range response frequency shift, even for close ranges (larger than 1 kHz). It is thereby possible to remove leakage by band pass filtering, which also removes communication leakage and phase ripple side lobes.

R1. Digital conversion of communication signal. In the special case proposed in the next section, communication will be in the form of short bursts with transmission not going on while receiving. Analog cancellation has then only the purpose of relieving input amplitude to the R1 ADC in order not to impose amplitudes which are harmful or would require undue recovery time. In this particular case ADC dynamic range is not required to be any better and may thus leave the ADC saturated under actual communication transmission bursts.

R2. Digital conversion of radar signal.

S. Received communication output.

T. Data buffer for data received across one frequency sweep.

U. Adjustment of phase for each Doppler channel.

V. Data storage for Doppler phase factors.

X. Range records for each Doppler channel obtained by Fourier transform.

Figure 12:
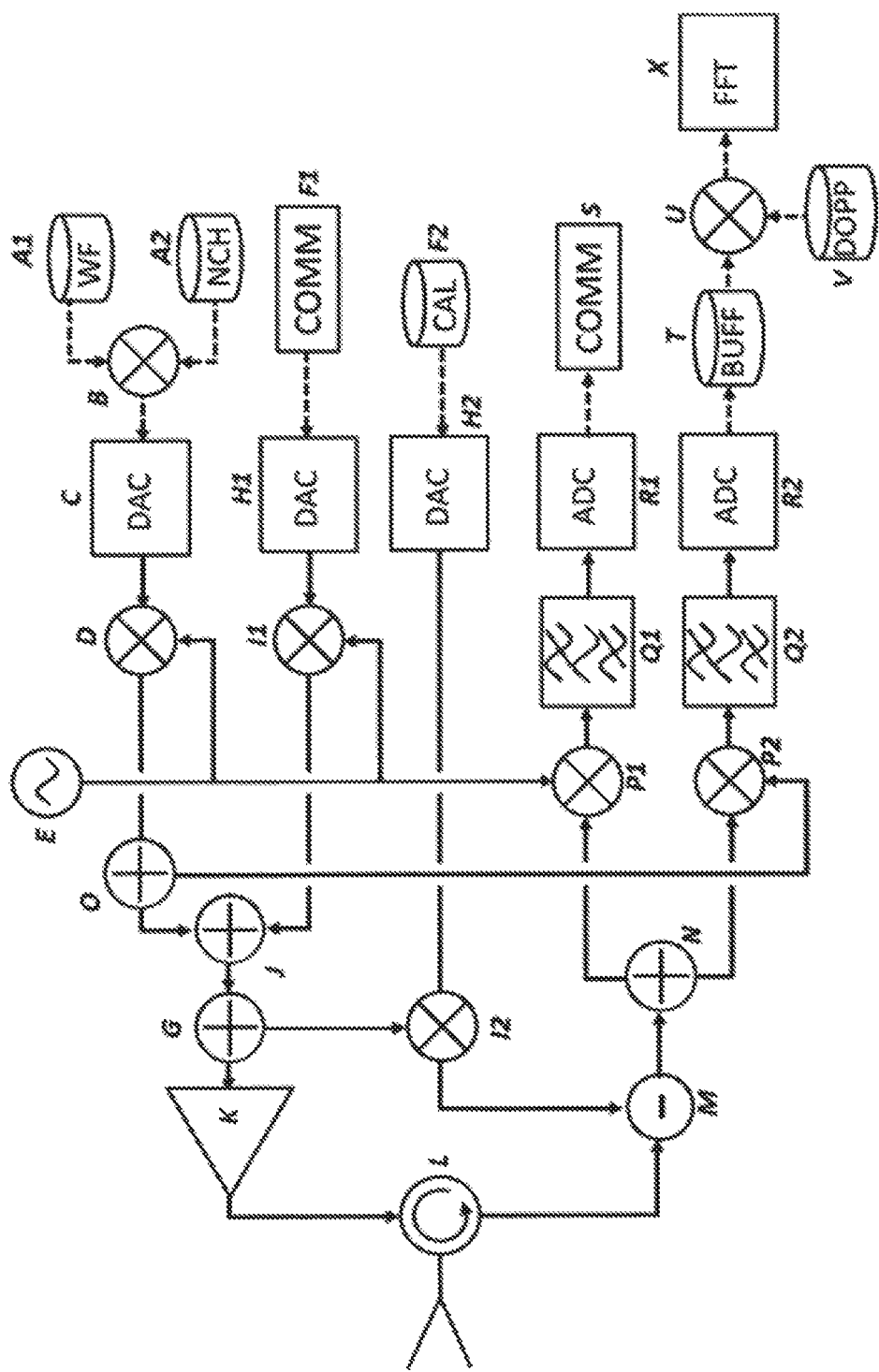
FIG. 12 shows a communication augmented CAW radar schematics, having a layout with cancelation pertaining to both radar and communication channels, where dotted lines represent digital signals and continuous lines represent analog signals.

For FIG. 12 the differences pertains to the components F2, G, I2 and M. For this latter layout:

F2. Filter parameters characterizing leakage across the full radar bandwidth, obtained by e.g. measuring leakage of an un-notched frequency sweep, with zero communication input.

G. Tapping of combined radar and communication signal

I2. Adjustment (multiplication) of combined signal to represent leakage

M. Subtraction of leakage across the entire bandwidth in a 180° hybrid.

3. Association Between Radar Data and Communication

Figure 13:
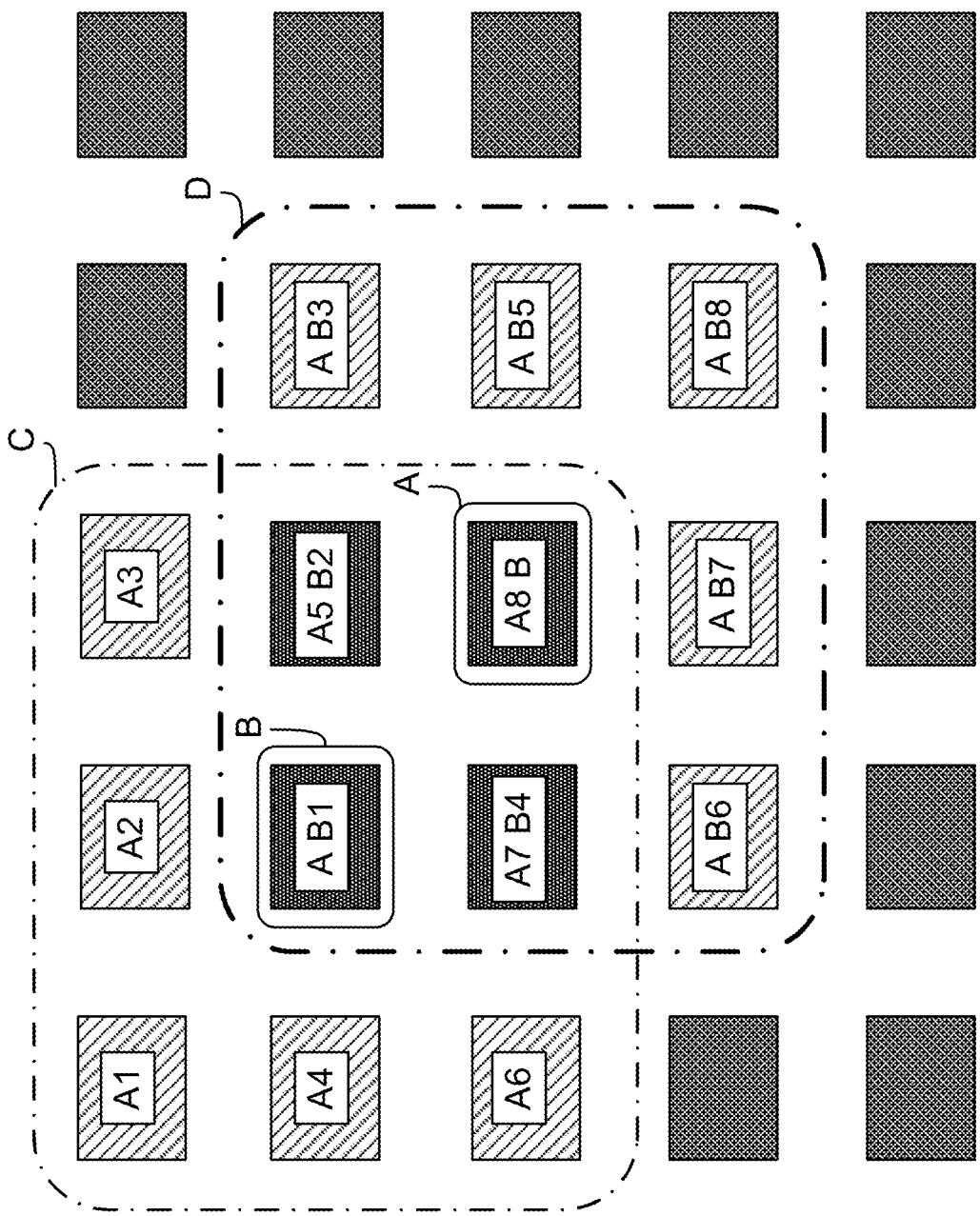
FIG. 13 shows an association between detection of vehicle A and vehicle B.

FIG. 13 shows an association between detection of A and B vehicle. Some large and indeterminate set of vehicles moving in different ways is illustrated as gray, crossed rectangles. In the vicinity of each other is vehicles A (A) and B (B). Each establishes detections within two partially overlapping collection of vehicles (the dotter rectangles C and D, where C is associated with vehicle B and D is associated with vehicle A). Association of the detections is obtained recognizing vehicle A as an object among vehicle B detections and vice versa.

It is envisaged that the communication data transmitted from the radar units onboard any particular vehicle reports on changes in the vehicle state of motion, as well as detections made by onboard sensors, e.g. GNSS and radar. An important requirement is association, i.e. the nature of the data communicated must allow any vehicle A receiving such communication to associate it with the particular vehicles to which it belongs, amongst the surrounding vehicles B, C, . . . . Thereby A will be able to create a situation picture in which its radar detections A1, A2, . . . is augmented by forewarnings on motion changes of each respective vehicle B, C, . . . as well as the detections B1, B2 . . . , C1, C2, . . . made by these, but perhaps not directly observable by the vehicle A radar. Augmentation of sensor data in this way requires the establishing association maps $$f_{AB}:\{A,A1,A2,\ldots\}\to\{B,B1,B2,\ldots\}$$

between every pair of vehicles in the vicinity of each other. The map means that some of the detections made by A can be set into correspondence with detections made at B. The basic possibility in setting up the map is to know the position displacement between A and B. From this knowledge the ranges and Doppler shifts, i.e. approach velocities, of vehicle B radar measurements can be transformed to fit and be added to the A radar measurements. GNSS provides the required information but at a resolution too modest to be efficient in congested traffic situations. Radar data has much higher precision and is thus better suited for setting up the association. Indeed maps $f_{AB}$ will only be established if vehicle A is detected by vehicle B. Similarly $f_{BA}$ will be established if vehicle B is detected by vehicle A. The association can then brought about by noting that range and Doppler (or more exactly the range-Doppler ambiguity trace in the range-Doppler plane) is the same for A measuring B as for B measuring A. Considering which of the detections at A and B exhibit the same range and Doppler the association between the corresponding data sets is established. For instance it may be found that A corresponds to B1, while B corresponds to A8 as in FIG. 13. Thereby $f_{AB}$: A→B1 and $f_{BA}$: B→A8. With this process carried out for any pair of vehicles within some preset range, association is completed between any vehicle and vehicles in its neighborhood. Being based on the very accurate range-Doppler data, the method would be able to deal with association also in quite congested traffic situations.

A suitable way of upholding communication is by essentially asynchronous brief messages either transmitted or received. The communication channel is thus normally empty, This should be possible since the information amount communicated for each vehicle is very small. It also relives (as explained above in bullet R1) the required isolation in the full multiplex communication scheme, implicit in the suggested radar design.

The invention claimed is:

1. A method for a continuous arbitrary waveform radar configured for transmitting and receiving signals over a selected communication band, the signals comprising at least one communication channel, wherein the method comprises:
generating a radar transmit signal with a waveform having a non-monotonic frequency change,
modifying the waveform to obtain at least one spectral notch, each spectral notch at a selectable frequency with a selectable bandwidth, the waveform is modified to maintain the spectral density of the transmit radar signal, and
isolating reception and transmission by cancellation.

2. The method according to claim 1, wherein each communication channel is at a fixed frequency, and the method further comprises: selecting the frequency and selecting the bandwidth of one of the at least one spectral notch to overlap with the fixed frequency.

3. The method according to claim 2, wherein the method further comprises using FM modulation of signals communicated over the communication channel.

4. The method according to claim 1, wherein the method further comprises: performing the modifying step on a transmit radar signal with an un-notched waveform.

5. The method according to claim 1, wherein the transmit radar signal has an amplitude function and a phase function and the step of modifying the waveform is performed by modifying the phase function.

6. The method according to claim 5, wherein the step of modifying the phase function stands in a one-to-one relation with the frequencies to be notched.

7. The method according to claim 5, wherein the phase function comprises phase ripple functions and phase ripple coefficients, the phase ripple coefficients are real to avoid amplitude modulation.

8. The method according to claim 1, wherein the step of modifying the waveform to obtain at least one spectral notch is further based on duty cycle.

9. The method according to claim 1, wherein the communication channel is a form of wide band short pulse communication, and the method further comprises: interleaving the transmit radar signal with the wide band short pulse communication.

10. The method according to claim 1, wherein the selected communication band is an instantaneous narrow band.

11. A continuous arbitrary waveform, CAW, radar for transmitting and receiving signals over a selected communication band, wherein the CAW radar comprises a CAW transceiver configured to:
generate a radar transmit signal with a waveform having a non-monotonic frequency change,
modify the waveform to obtain at least one spectral notch, each spectral notch at a selectable frequency with a selectable bandwidth, the waveform is modified to maintain the spectral density of the transmit radar signal, and
isolate reception and transmission by cancellation.

12. The CAW radar according to claim 11, wherein each communication channel is at a fixed frequency, and the CAW transceiver is further configured to select the frequency and select the bandwidth of one of the at least one spectral notch to overlap with the fixed frequency.

13. The CAW radar according to claim 12, wherein the CAW transceiver further is configured to use FM modulation of signals communicated over the communication channel.

14. The CAW radar according to claim 11, wherein the CAW transceiver further is configured to modify the transmit radar signal with an un-notched waveform.

15. The CAW radar according to claim 11, wherein the transmit radar signal has an amplitude function and a phase function and the CAW transceiver further is configured to modify the phase function.

16. The CAW radar according to claim 15, wherein the CAW transceiver further is configured to modify the phase function in a one-to-one relation with the frequencies to be notched.

17. The CAW radar according to claim 15, wherein the phase function comprises phase ripple functions and phase ripple coefficients, the phase ripple coefficients are real to avoid amplitude modulation.

18. The CAW radar according to claim 11, wherein the CAW transceiver further is configured to modify the waveform to obtain at least one spectral notch based on duty cycle.

19. The CAW radar according to claim 11, wherein the communication channel is a form of wide band short pulse communication, and the CAW transceiver further is configured to interleave the transmit radar signal with the wide band short pulse communication.

20. The CAW radar according to claim 11, wherein the selected communication band is an instantaneous narrow band.

21. A vehicle comprising a continuous arbitrary waveform, CAW, radar as defined in claim 11.

22. The vehicle according to claim 21, wherein the vehicle is an airborne vehicle.

23. A radar system comprising a plurality of vehicles as defined in claim 21, wherein the transmit radar signals comprise a set of quasi-orthogonal radar waveforms, QOW, to prevent radar signals between individual radar units in the plurality of vehicles to interfere with each other.

24. The radar system according to claim 23, wherein the set of QOW comprises a fixed chirp rate, and each CAW radar being strict synchronized regarding chirp rates.

25. The radar system according to claim 24, wherein the chirp rates are synchronized using a common time base by locking to global positioning system, GPS.

26. The radar system according to claim 23, wherein the waveform of the transmit radar signals have a Linear Frequency Modulation, LFM, waveform, and the system is configured to detect mutually interference between CAW radars and to randomly change a LFM delay after mutually interference is detected.

27. The radar system according to claim 23, wherein each vehicle is configured to determine activities related to changing vehicle state of motion, and to communicate the determined activities over the communication channel to surrounding vehicles.

28. A communication unit for simultaneously receiving and re-transmitting the signals comprising a CAW radar as defined in claim 11.

* * * * *